(12) United States Patent
Ganesan et al.

(10) Patent No.: US 11,496,191 B2
(45) Date of Patent: Nov. 8, 2022

(54) SYSTEMS, DEVICES, AND METHODS FOR PROVIDING POWER-PROPORTIONAL COMMUNICATION

(71) Applicant: University of Massachusetts, Boston, MA (US)

(72) Inventors: Deepak Ganesan, Amherst, MA (US); Pan Hu, Palo Alto, CA (US)

(73) Assignee: UNIVERSITY OF MASSACHUSETTS, Boston, MA (US)

(*) Notice: Subject to any disclaimer, the term of this patent is extended or adjusted under 35 U.S.C. 154(b) by 370 days.

(21) Appl. No.: 16/312,608

(22) PCT Filed: Jun. 29, 2017

(86) PCT No.: PCT/US2017/040086
§ 371 (c)(1),
(2) Date: Dec. 21, 2018

(87) PCT Pub. No.: WO2018/005855
PCT Pub. Date: Jan. 4, 2018

(65) Prior Publication Data
US 2019/0173543 A1 Jun. 6, 2019

Related U.S. Application Data

(60) Provisional application No. 62/356,135, filed on Jun. 29, 2016.

(51) Int. Cl.
*H04B 7/06* (2006.01)
*H04W 52/02* (2009.01)
(Continued)

(52) U.S. Cl.
CPC ......... *H04B 7/0602* (2013.01); *H01Q 1/2225* (2013.01); *H01Q 21/28* (2013.01);
(Continued)

(58) Field of Classification Search
CPC ...... H04B 7/0602; H04B 1/38; H04B 1/3833; H04B 1/04; H04B 2001/3855;
(Continued)

(56) References Cited

U.S. PATENT DOCUMENTS 6,438,647 B1 * 8/2002 Nielson ............... G06F 12/0804
711/E12.04
9,223,377 B1 * 12/2015 Nachum ............... G06F 1/3278
(Continued)

*Primary Examiner* — Hoang-Chuong Q Vu
(74) *Attorney, Agent, or Firm* — Thomas | Horstemeyer, LLP

(57) ABSTRACT

Systems, devices, and methods for proportionally balancing power during wireless communication are provided. The disclosures provide for an integrated radio in which the functionality of an active radio and a passive radio are integrated into a single radio, with the active and passive radios each being configured to operate in three different modes: active, passive, and backscatter. Based on power and communication link information, the integrated rode is able to balance the modes at which the two radios are operated, thereby optimizing power consumption of the device into which the integrated radio is incorporated. The resulting systems, devices, and methods lead to ultra-low power consumption that enables these communication techniques to enhance computing devices from smartwatches to laptops. Devices incorporating the integrated radios, and methods for power-proportionally exchanging data, among other systems, devices, and methods, are also provided.

21 Claims, 19 Drawing Sheets

(51) Int. Cl.
*H04B 1/04* (2006.01)
*H04W 4/80* (2018.01)
*H04B 1/3827* (2015.01)
*H04B 1/38* (2015.01)
*H01Q 1/22* (2006.01)
*H01Q 21/28* (2006.01)

(52) U.S. Cl.
CPC ............. *H04B 1/04* (2013.01); *H04B 1/38* (2013.01); *H04B 1/3833* (2013.01); *H04W 4/80* (2018.02); *H04W 52/0261* (2013.01); *H04B 2001/3855* (2013.01); *H04B 2001/3861* (2013.01); *Y02D 30/70* (2020.08)

(58) Field of Classification Search
CPC ...... H04B 2001/3861; H04W 52/0261; H04W 4/80; H01Q 1/2225; H01Q 21/28; Y02D 70/10; Y02D 70/20; Y02D 70/444; Y02D 70/162; Y02D 70/142; Y02D 70/26; Y02D 70/14; Y02D 70/40; Y02D 70/166; Y02D 70/144
See application file for complete search history.

(56) References Cited

U.S. PATENT DOCUMENTS

| | | | |
|---|---|---|---|
| 9,888,337 B1* | 2/2018 | Zalewski | H02N 11/002 |
| 2003/0104848 A1* | 6/2003 | Brideglall | G06K 7/10297 |
| | | | 455/574 |
| 2004/0213170 A1* | 10/2004 | Bremer | H04L 5/16 |
| | | | 370/282 |
| 2006/0205443 A1* | 9/2006 | Simoens | H04W 52/0245 |
| | | | 455/574 |
| 2006/0239217 A1* | 10/2006 | Hassan | H04L 67/14 |
| | | | 455/13.4 |
| 2006/0253736 A1* | 11/2006 | Rudolf | H04W 52/18 |
| | | | 714/12 |
| 2008/0096499 A1* | 4/2008 | Amtmann | H04B 5/02 |
| | | | 455/127.5 |
| 2010/0067401 A1* | 3/2010 | Medvedev | H04L 1/06 |
| | | | 370/253 |
| 2010/0169691 A1* | 7/2010 | Hwang | G06F 1/3209 |
| | | | 713/340 |
| 2011/0116407 A1* | 5/2011 | Ren | H04W 56/00 |
| | | | 370/252 |
| 2012/0026926 A1* | 2/2012 | Frenzel | H04L 5/0046 |
| | | | 370/311 |
| 2014/0303801 A1* | 10/2014 | Ahn | H04L 12/12 |
| | | | 700/295 |
| 2015/0245299 A1* | 8/2015 | Lee | H04W 68/00 |
| | | | 370/311 |
| 2015/0348333 A1* | 12/2015 | Ward, III | G07B 15/02 |
| | | | 705/13 |
| 2015/0363339 A1* | 12/2015 | Huang | G06F 13/10 |
| | | | 710/33 |
| 2017/0105221 A1* | 4/2017 | Ahluwalia | H04W 76/15 |
| 2017/0172473 A1* | 6/2017 | Wedekind | A61B 5/742 |
| 2017/0353054 A1* | 12/2017 | Lee | H02J 50/40 |
| 2017/0359694 A1* | 12/2017 | Jensen | G01S 5/0072 |
| 2018/0017629 A1* | 1/2018 | Park | H04L 65/604 |

* cited by examiner

FIG. 9B Bottom Layer

FIG. 9A Top Layer

SYSTEMS, DEVICES, AND METHODS FOR PROVIDING POWER-PROPORTIONAL COMMUNICATION

CROSS REFERENCE TO RELATED APPLICATION

The present application is a national stage application of International Application No. PCT/US2017/040086, filed Jun. 29, 2017, which claims priority to and the benefit of U.S. Provisional Application No. 62/356,135, filed on Jun. 29, 2016, and titled "An Integrated Low Power Active-Passive Radio," the content of which is incorporated herein by reference in its entirety.

GOVERNMENT RIGHTS

This invention was made with Government support under Grant Nos. CNS-1218586, CNS-1217606, and CNS-1239341, each of which was awarded by the National Science Foundation, and Grant No. 1U54EB020404 awarded by the National Institute of Health. The Government has certain rights in the invention.

FIELD

The present application relates to systems, devices, and methods for providing power-proportional wireless data communication, and more particularly relates to the dynamic use of multiple power operating modes to optimize power consumption among computing devices.

BACKGROUND

With every passing day, the world becomes more digitally interconnected. The Internet of Things (IoT) continues to facilitate this interconnection of devices. In fact, estimates indicate that the number of connected devices is expected to grow to anywhere from 20 to 50 billion by the end of the decade. Connected devices can range from stand-alone sensors such as accelerometers, to wearable devices, vehicles, power plants, buildings, and more. Typically, interconnected devices are embedded with electronics and software, including connectivity means, in order to collect and/or exchange data with other devices.

Daily, humans carry and use a variety of devices including wearables such as activity trackers (e.g., Fitbits® and Misfit Shines), smartphones (e.g., iPhones and Android phones), smartwatches (e.g., Apple Watches and Samsung Gear watches), and laptops or tablets (e.g., Apple MacBook Pro, Surface Book). Often, these devices are interconnected to share data. For example, a person's activity tracker can be connected to his or her smartphone and laptop to transmit the data sensed or tracked by the device, such as the number of steps taken or the amount of calories burned by the user in a given time period. Transmitting data between devices is desirable because it allows a person to, among other things, store, manage, and/or manipulate the data in different ways facilitated by the diverse functionality of each device. However, this transmission of data among interconnected devices can require significant amounts of power, thus causing the batteries that power these devices to drain at undesirable rates.

Traditional computing devices include communication means such as radios and radio technologies (e.g., Wi-Fi, Bluetooth, etc.) to exchange (e.g., transmit, receive) data. Due to the large amount of power needed to exchange data among interconnected devices, low-power radios and technologies such as Bluetooth Low Energy (BLE), ZigBee, Z-Wave, and others have been developed to reduce the amount of power consumed by devices during the data exchange process. These technologies, while reducing power consumption relative to other traditional technologies, can be designed to do so in a manner that is symmetric, meaning that devices in communication consume the same, or substantially the same, amount of power as each other.

One drawback of symmetric power consumption is that it does not account for the amount of energy available in each device. This is significant not only when two identical devices have different energy availabilities, but also when two different types of devices have different energy capacities. Typically the energy availability and/or capacity of a device is roughly proportional to the battery's volume, which in turn is roughly proportional to the size of the device itself. For example, the battery capacity on a laptop is generally three orders of magnitude larger than a typical fitness band, two orders of magnitude larger than a typical smartwatch, and an order of magnitude larger than a typical smartphone. The symmetrical power consumption of traditional radios and technologies, therefore, causes two devices having vastly different energy capacities or availabilities to consume substantially similar amounts of power during a data exchange, causing the smaller device or smaller battery to be disproportionally burdened and eventually power-drained.

Thus, there is a need for a radio that can enable asymmetric power consumption between devices such that the amount of power consumed by the devices is proportional, or substantially proportional, to their respective available energy. There is also a need for such a radio to provide various power consumption operating modes that can switch the power burden from one device to another, to achieve power-proportionality, while minimizing signal loss and maximizing throughput and range. There is further a need for any such solutions to be as small as possible so such solutions can be implemented in devices of varying sizes, including wearable devices like smartwatches and activity trackers.

SUMMARY

Systems, devices, and methods for dynamically splitting the power burden between multiple computing devices are provided for in the present disclosure. More particularly, the functionalities of active and passive radios that can traditionally be found in separate computing devices are modified such that one radio has the ability of performing the functionalities of both an active and passive radio. Such an integrated radio, which is referred to herein as a Braidio at times, can also have either of the functionalities operate in a backscatter mode, thus allowing the integrated radio to operate in an ultra-low power manner. The integrated radio is able to balance the power between two computing devices based on power and communication link information, thus allowing for efficient data transfer that consumes significantly less energy than existing wireless data transfer techniques.

In one exemplary embodiment of a method for power-proportionally exchanging data, the method includes obtaining first power information that corresponds to a first device and first communication data that corresponds to a first communication link between the first device and a second device, as well as receiving second power information from the second device. The second power information corresponds to the second device. The method further includes determining one or more feasible operating modes from among a plurality of candidate operating modes, those modes including at least one of an active mode, a passive mode, and a backscatter mode. Still further, the exemplary method includes calculating an optimal strategy for exchanging data with the second device based on the determined feasible operating mode(s), and exchanging the data with the second device according to the calculated optimal strategy.

The action of obtaining the first communication data can be performed in a variety of ways, but in some embodiments it includes transmitting one or more probe packets to the second device over the first communication link. In some embodiments, the method can include receiving, from the second device, second communication data that corresponds to a second communication link between the first device and the second device. In such cases, the feasible operating mode(s) can be determined based on one or more of the first power information, the second power information, the first communication data, and the second communication data. The first power information and the second power information can include respective battery information, with the battery information including a battery capacity and/or a battery availability. Further, the first communication data and the second communication data can include respective signal-to-noise ratios and bitrate information that corresponds to each of the candidate operating modes. In some such embodiments, the bitrate information of the first communication data and the second communication data can indicate maximum bitrates over the respective first communication link and second communication link for each of the candidate operating modes.

The optimal strategy can indicate an amount of time in which to exchange the data under each of the feasible operating mode(s). In such embodiments, the optimal strategy can also indicate an order in which to exchange the data for the indicated amount of time under each of the feasible operating mode(s). Moreover, the optimal strategy can be at least partially proportional to the first power information and the second power information.

The first device can be a transmitter that has a first integrated radio, and the second device can be a receiver that has a second integrated radio. Each of the first and second integrated radios can include an active radio and a passive radio. A combined power consumption of the first device and the second device can be about 150 milliwatts or less, with the power consumption being based on the feasible operating mode(s) under which the data is exchanged.

In some exemplary embodiments, the optimal strategy can result in asymmetric power consumption between the first device and the second device. In some such instances, a ratio of the asymmetric power consumption between the first device and the second device can be approximately in the range of about 1:3000 to about 4000:1.

The method can further include obtaining a dynamic signal-to-noise ratio of the first communication link or the second communication link over which the data is exchanged with the second device during the exchange of the data. If the signal-to-noise ratio is less than a threshold ratio while the data is exchanged under the backscatter mode, the method can further include switching to the active mode or the passive mode to exchange the data.

One exemplary embodiment of a computing device includes an integrated radio and a microcontroller. The integrated radio is configured with active radio functionality and passive radio functionality. The microcontroller is communicatively coupled to the integrated radio and operates as follows. The microcontroller obtains first power information and first communication data corresponding to a first communication link with another computing device, and receives, from the other computing device, second power information and second communication data corresponding to a second communication link with the other computing data. One or more feasible operating modes are determined from among a plurality of candidate operating modes. The feasible operating mode(s) is (are) determined based, at least in part, on one or more of the first power information, the second power information, the first communication link information, and the second communication link information. Further, the feasible operating mode(s) include one or more of an active mode, a passive mode, and a backscatter mode. The microcontroller calculates an optimal strategy for exchanging data with the other computing device based on the feasible operating mode(s), and exchanges the data with the other computing device according to the calculated optimal strategy.

The computing device can be configured as a transmitter or a receiver. For example, in some instances, the computing device can be configured as a transmitter and operable to transmit the data to the other computing device, which is configured as a receiver, with the receiver being operable to receive the transmitted data from the transmitter. In some such instances, the computing device can: consume an equal, or substantially equal amount, of power as the receiver while in the active mode; consume more power than the receiver while in the passive mode; and consume less power than the receiver while in the backscatter mode. The power consumed by the computing device and the receiver can be measured by the number of bits transmitted per unit of respective energy consumed. Moreover, the computing device can: generate a carrier signal and transmit the carrier signal to the receiver using the active radio functionality while in the active mode; generate the carrier signal and transmit the carrier signal to the receiver using the active radio functionality while in the passive mode; and not generate the carrier signal and reflect, using a backscatter tag, the carrier signal received from a backscatter reader or the receiver.

In another example, the computing device can be configured as a receiver and operable to receive the data from the other computing device that is configured as a transmitter. In some such instances, the computing device can: generate a carrier signal and transmit the carrier signal to the transmitter using the active radio functionality while in the active mode; not generate the carrier signal and receive a carrier signal from the transmitter while in the passive mode; and generate the carrier signal and transmit the carrier signal to the transmitter while in the backscatter mode.

The integrated radio can be at least one of a Bluetooth radio and a Wi-Fi radio. Further, the passive radio functionality of the integrated radio can include a backscatter tag functionality, as well as a backscatter reader functionality. The action of identifying the first communication data can include transmitting one or more probe packets to the other computing device over the first communication link.

In some embodiments, the first power information can include battery information that corresponds to the computing device, and the second power information can include battery information that corresponds to the other computing device. The first communication data and the second communication data can include respective signal-to-noise ratios and bitrate information that corresponds to each of the candidate operating modes. In some instances, the bitrate information can indicate maximum bitrates over the respective first communication link or second communication link for each of the candidate operating modes.

The optimal strategy can indicate an amount of time in which to exchange the data under the feasible operating mode(s). The optimal strategy can further indicate an order in which to exchange the data for the indicated amount of time under the feasible operating mode(s). The optimal strategy can be at least partially proportional to the first power information and the second power information. Further, the optimal strategy can result in asymmetric power consumption between the computer device and the other computing device. In some embodiments, a ratio of the asymmetric power consumption between the computing device and the other computing device can be approximately in the range of about 1:3000 to about 4000:1.

Other functions of the microcontroller are possible. For example, the microcontroller can be operable to obtain a dynamic signal-to-noise ratio of the first communication link or the second communication link over which the data is exchanged with the other device during the exchange of the data. If the signal-to-noise ratio is less than a threshold ratio while the data is exchanged under the backscatter mode, the microcontroller can switch to the active mode or the passive mode to exchange the data.

The computing device can also include an antenna switching module that is communicatively coupled to the microcontroller and the integrated radio. The antenna switching module can operable to select one of a plurality of antenna of the integrated radio. The microcontroller can cause the antenna switching module to select a different one of the plurality antennas when switching among the one or more feasible operating modes.

In some embodiments, the integrated radio can include a passive receiver that has an envelope detector unit operable to extract an envelope from a received signal. In some such embodiments, the passive receiver can also include a high-pass filter that is operable to receive an envelope output by the envelope detector to identify and remove interference. Alternatively, or additionally, in some such embodiments, the passive receiver can also include a charge pump circuit that is operable to receive an envelope output by the envelope detector and convert the envelope to DC voltage. In some such instances, the passive receiver can further include an instrument amplifier disposed between the charge pump circuit and a comparator to provide increased receiver sensitivity. In some embodiments that includes an envelope detector, the passive receiver can further include a SAW filter disposed before the envelope detector to control signal types received by the envelope detector.

BRIEF DESCRIPTION OF DRAWINGS

This disclosure will be more fully understood from the following detailed description taken in conjunction with the accompanying drawings, in which.

Figure 2:
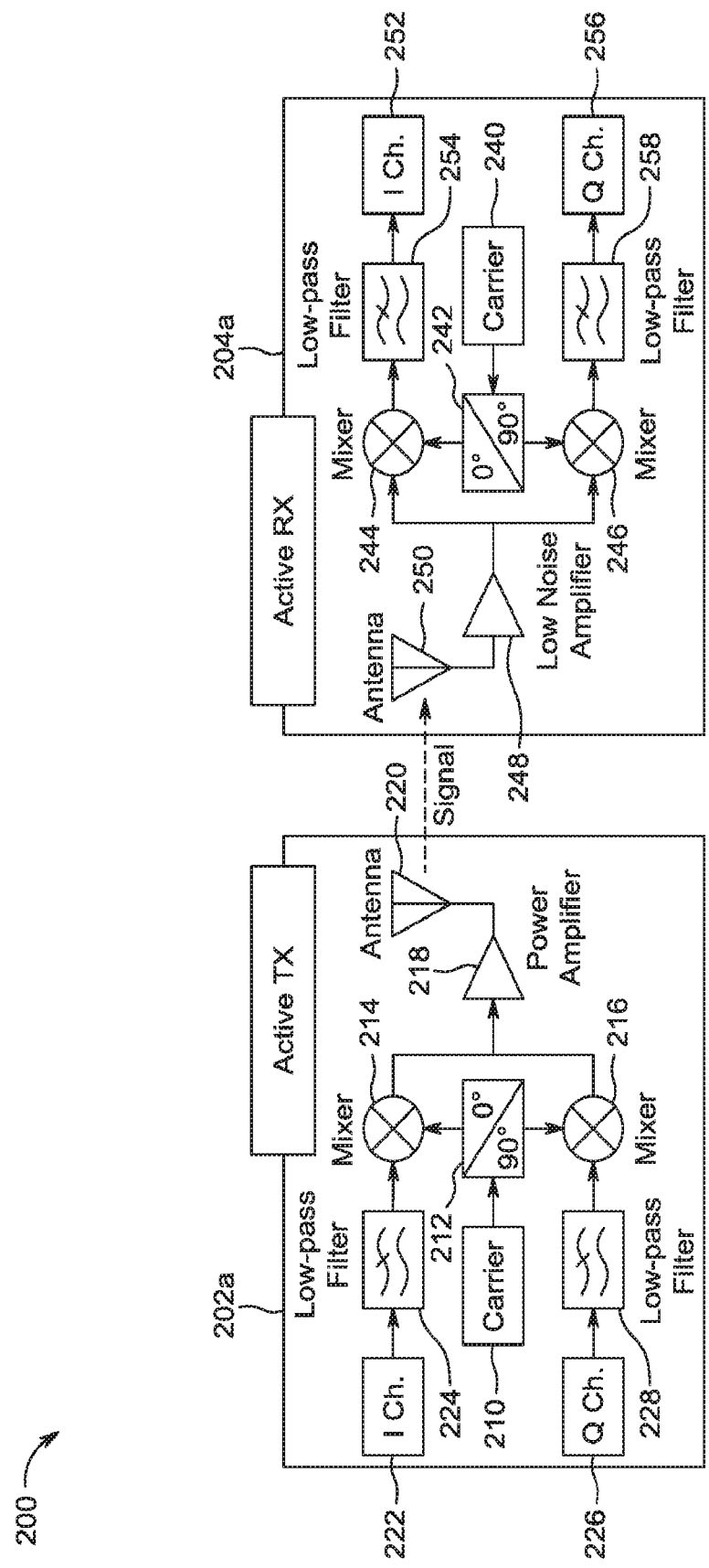
Figure 3:
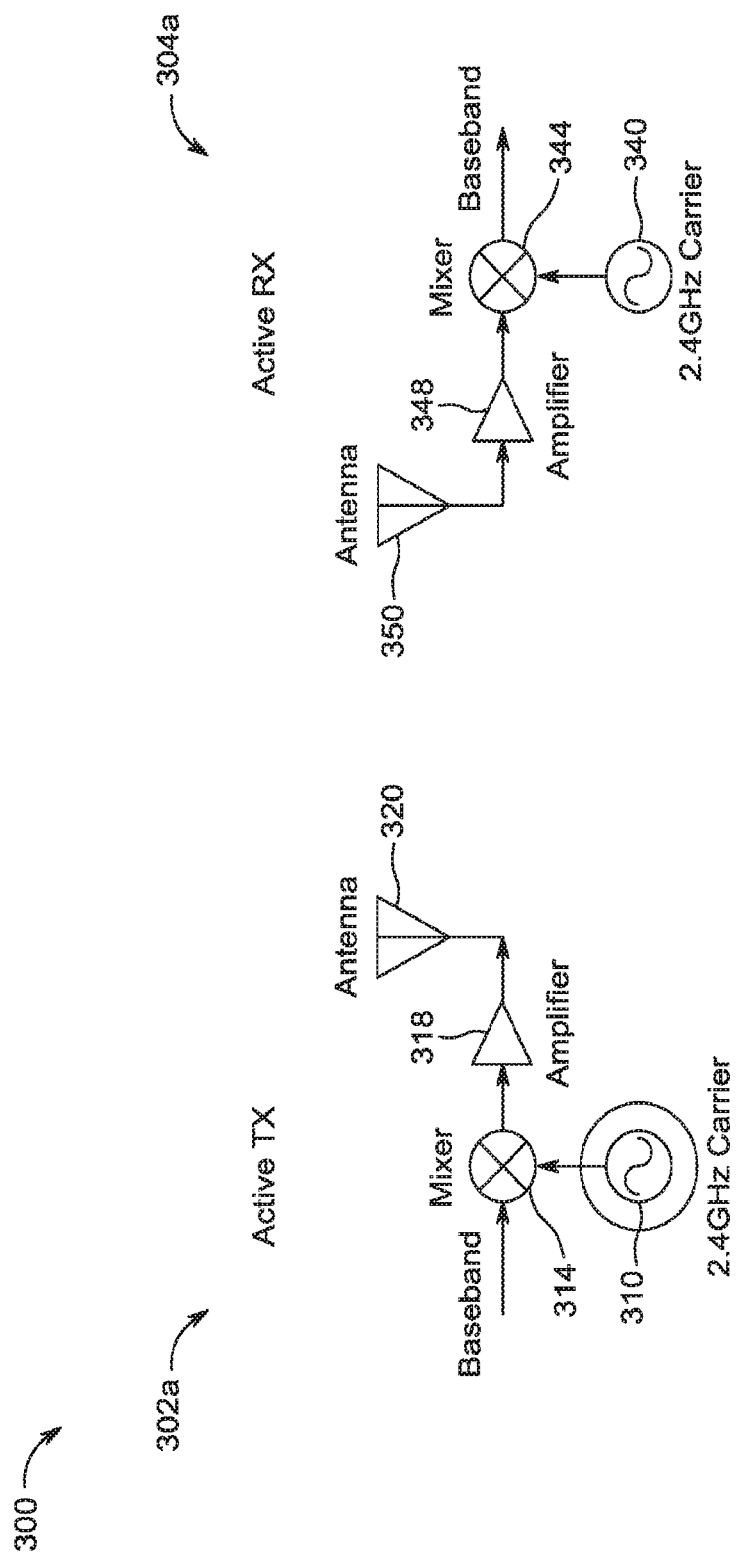
Figure 4:
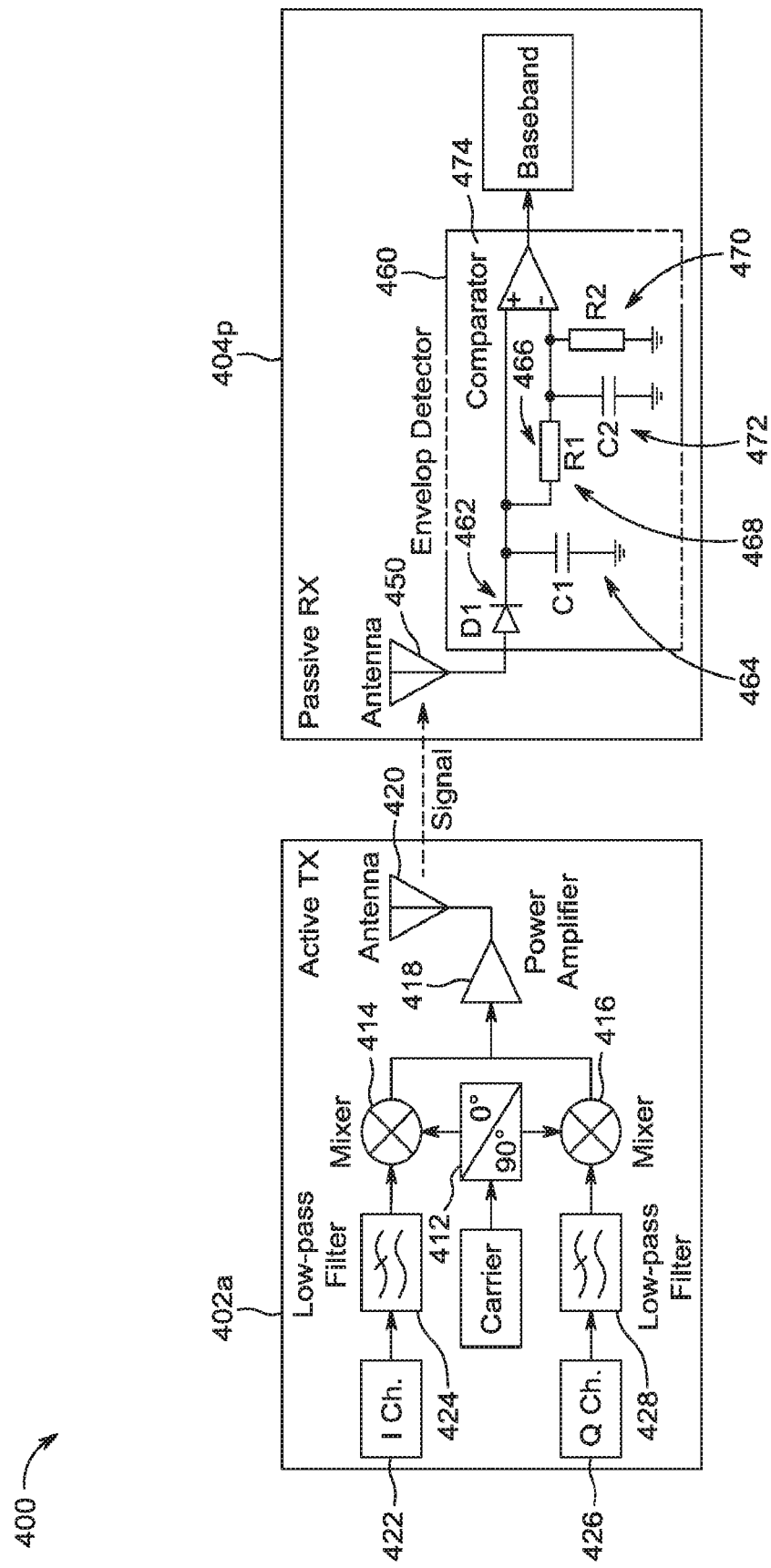
Figure 5:
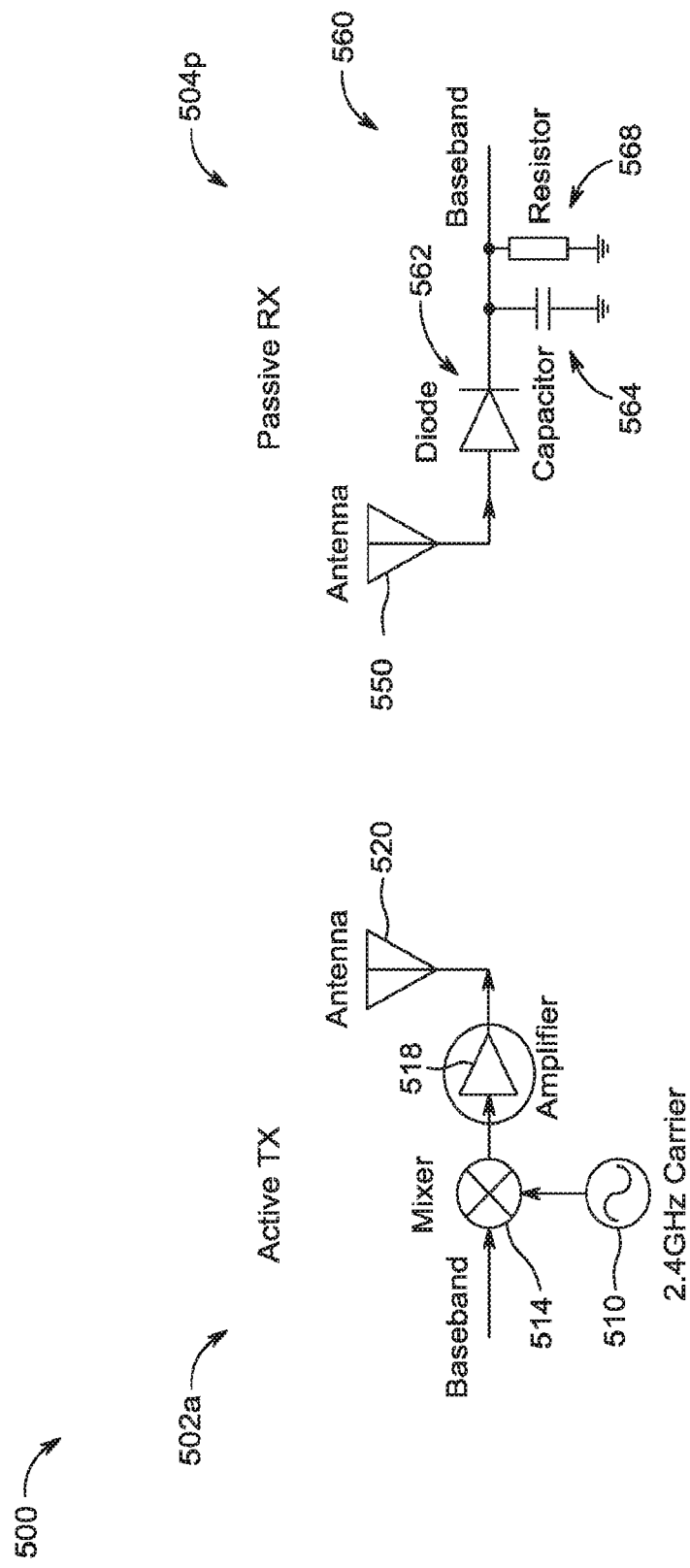
Figure 6:
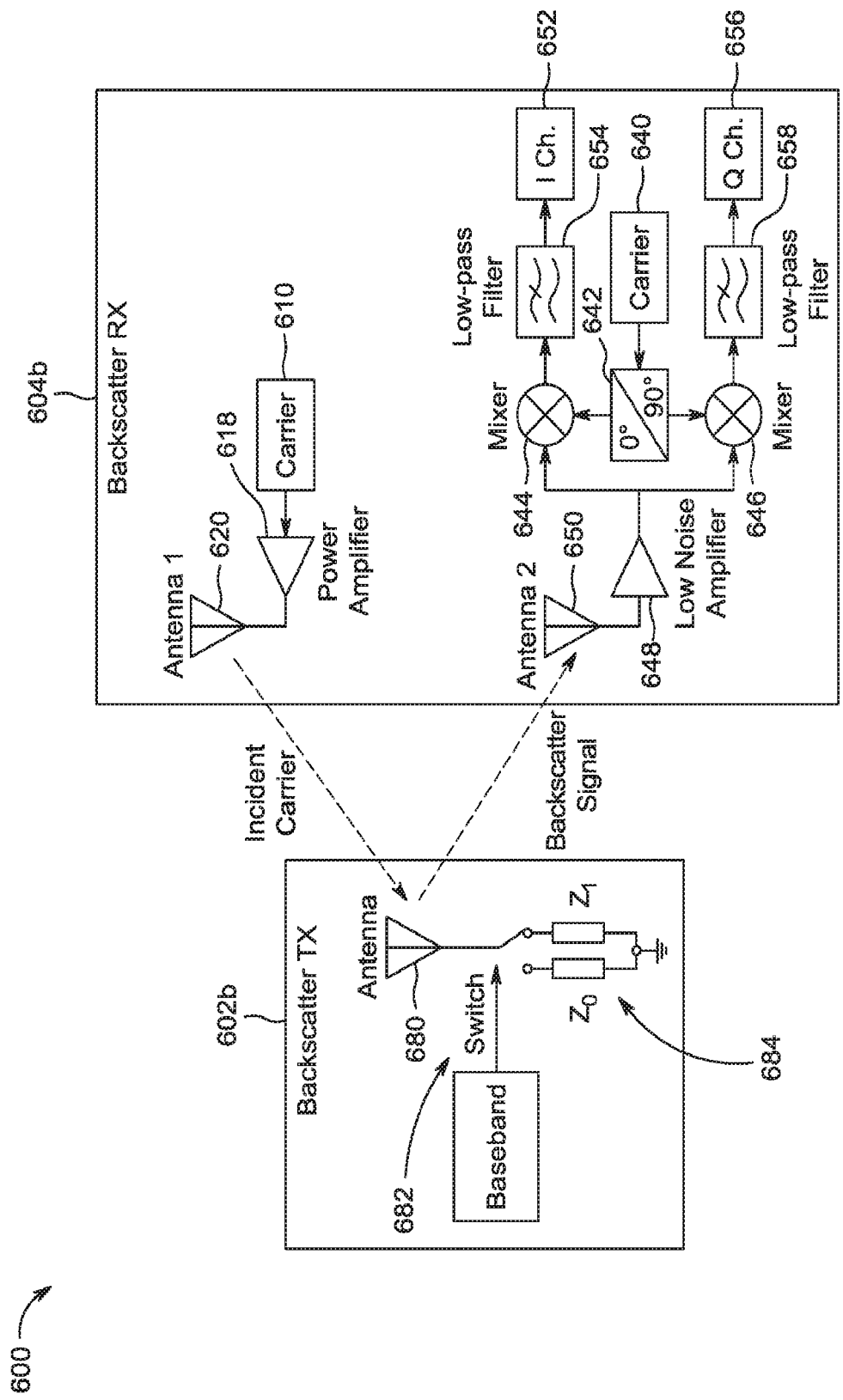
Figure 7:
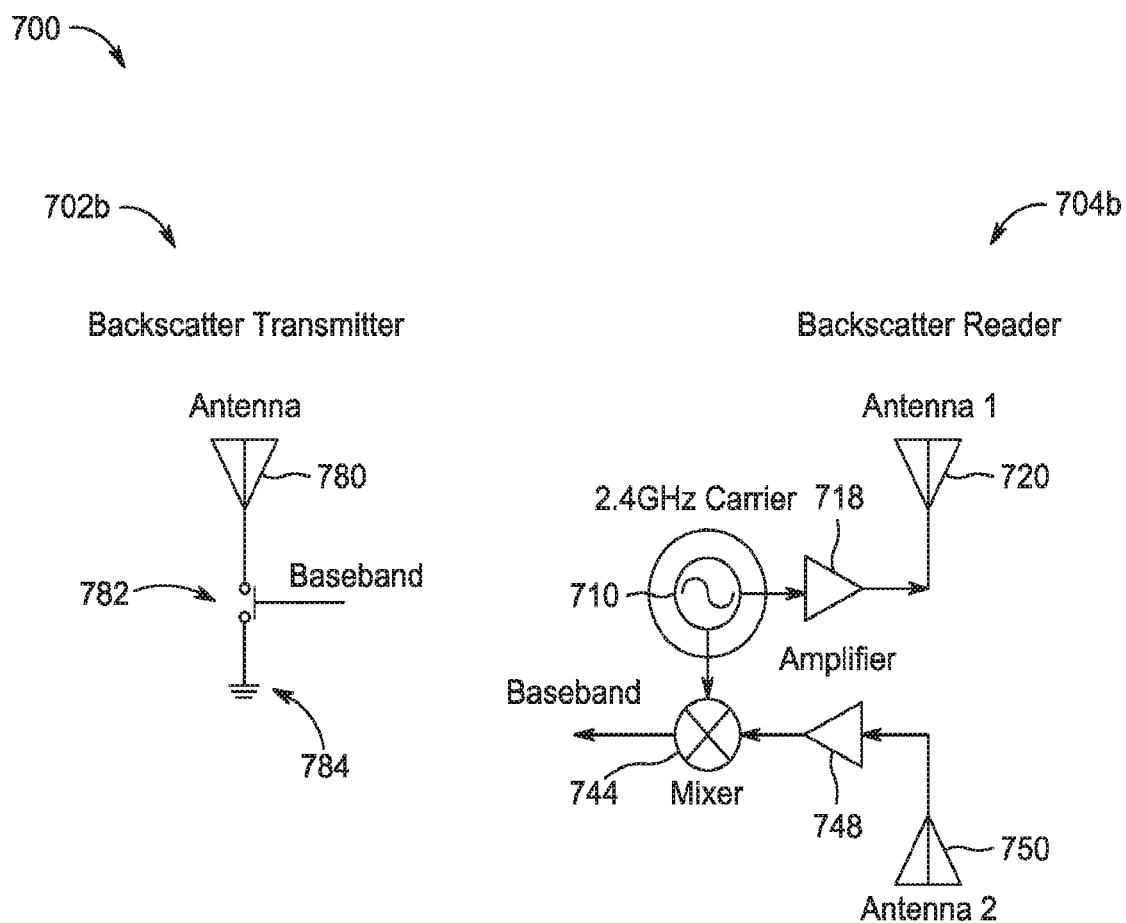
Figure 8:
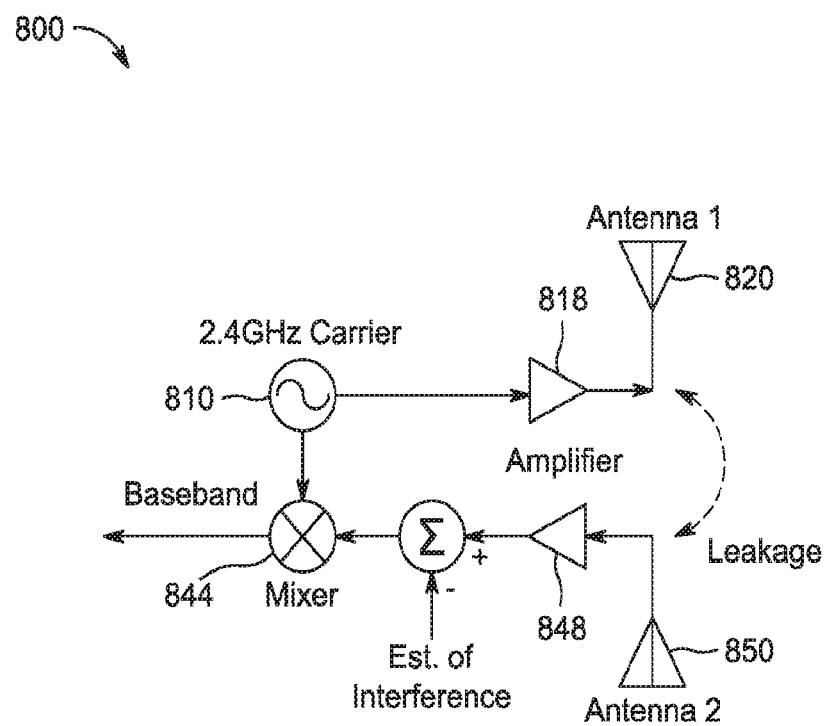
Figure 9:
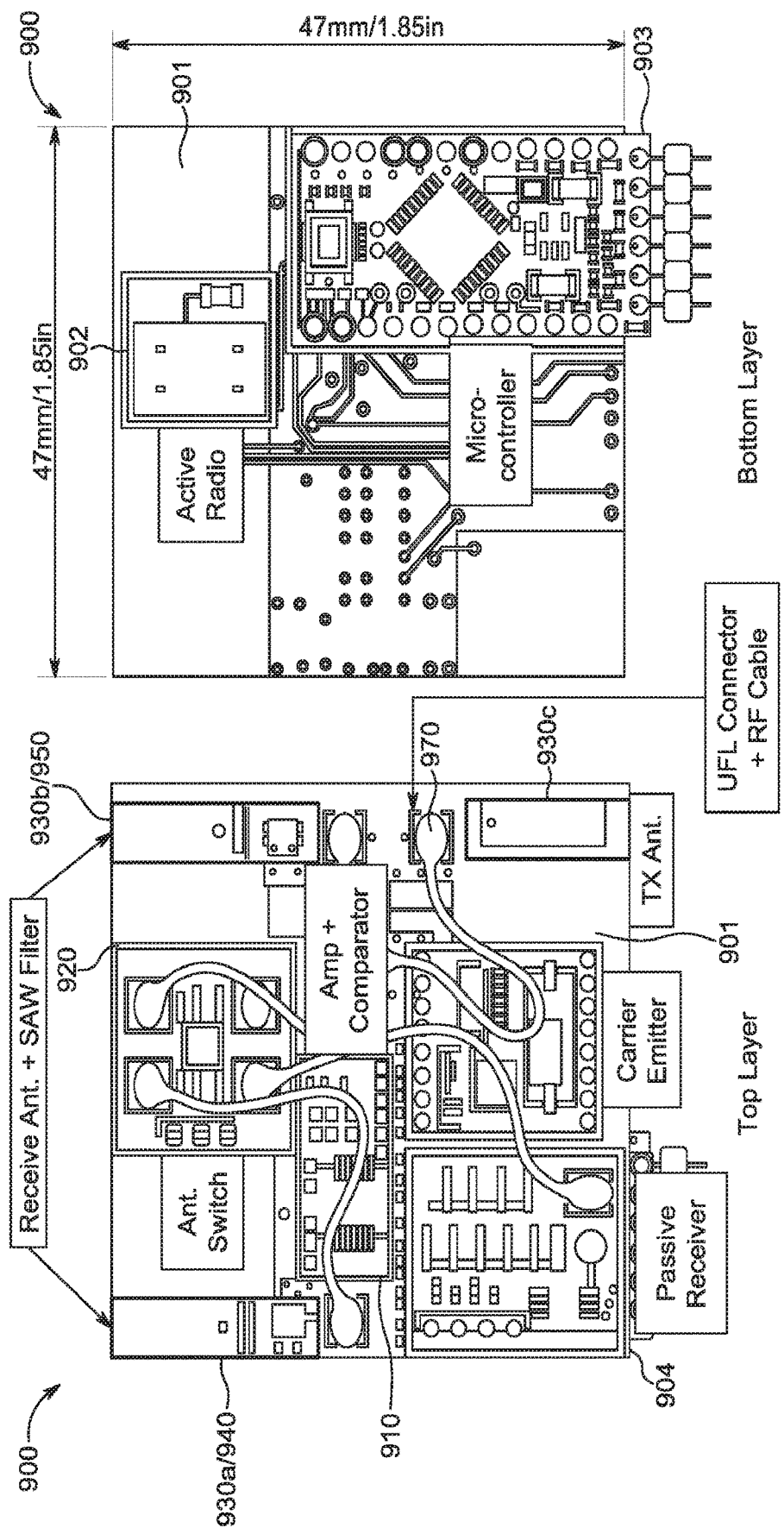
Figure 10:
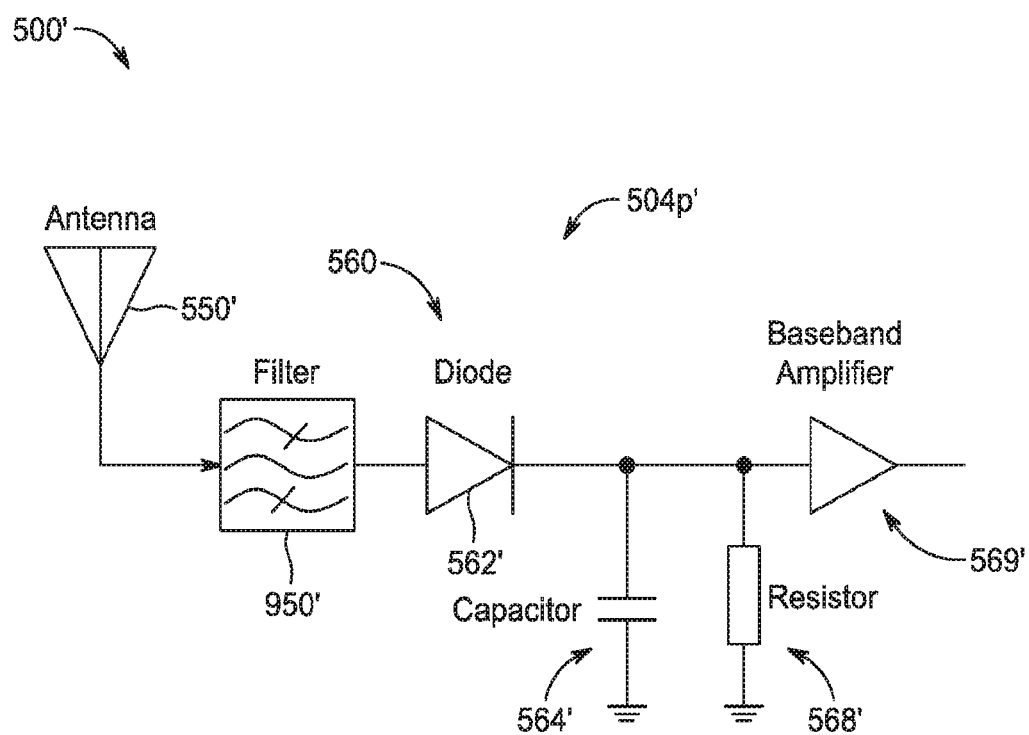
Figure 11:
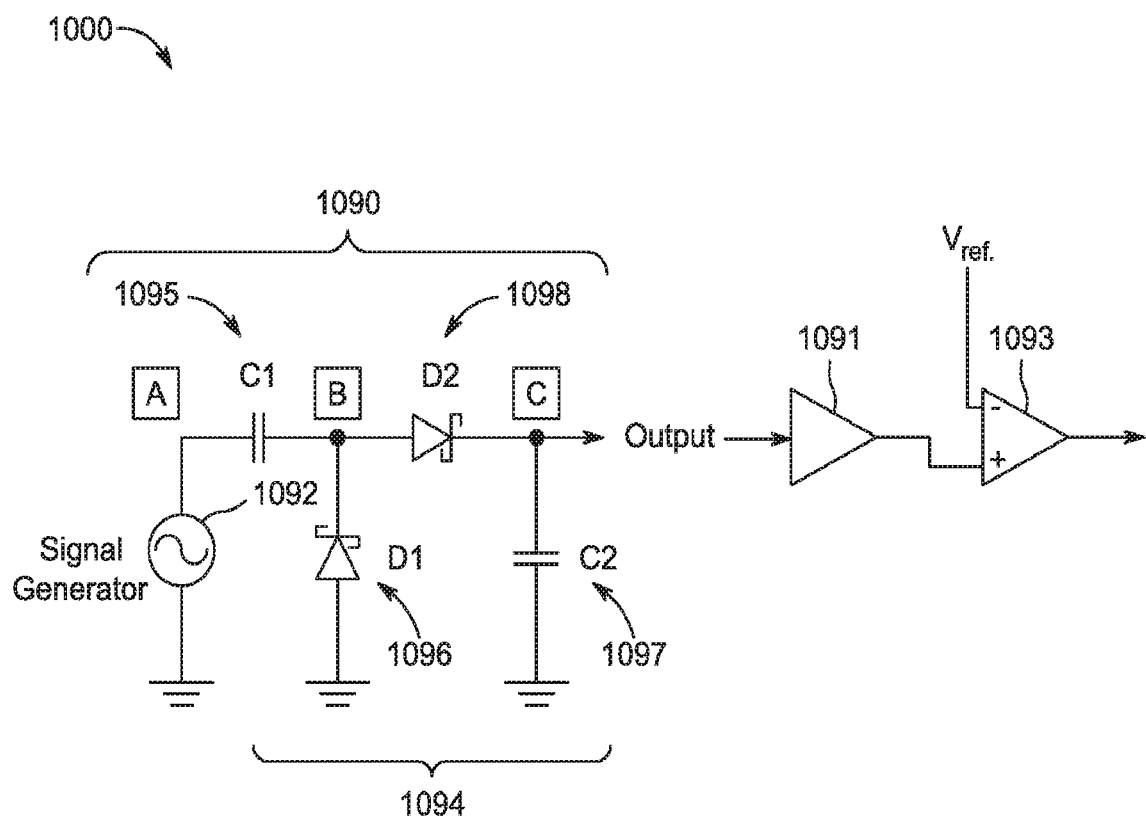
Figure 12:
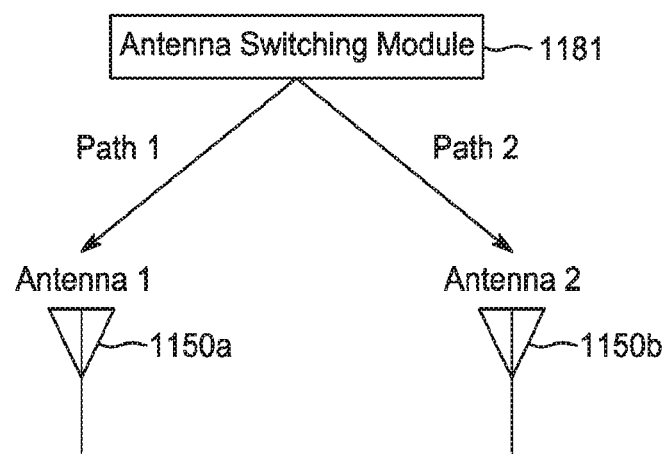
Figure 13:
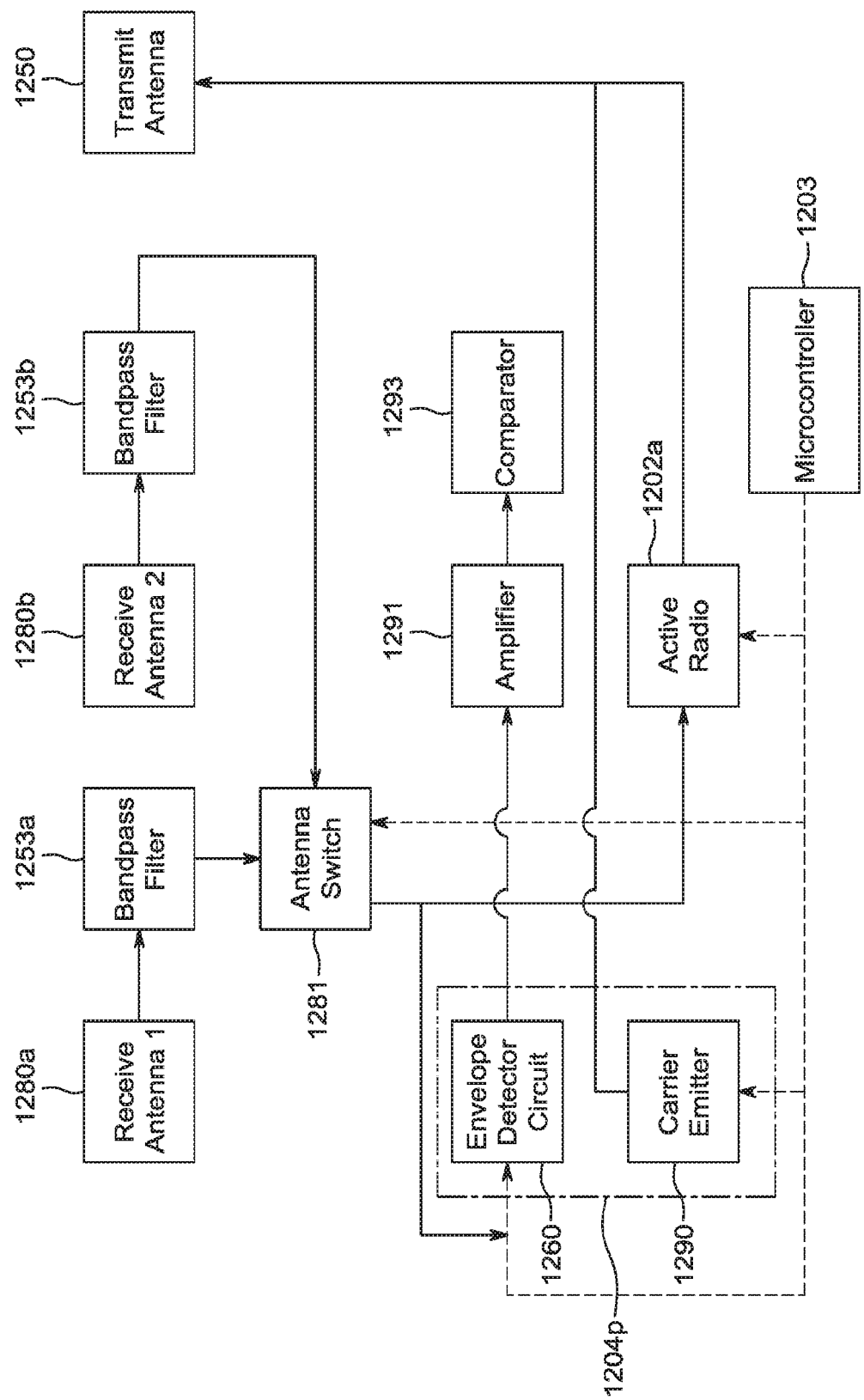
Figure 14:
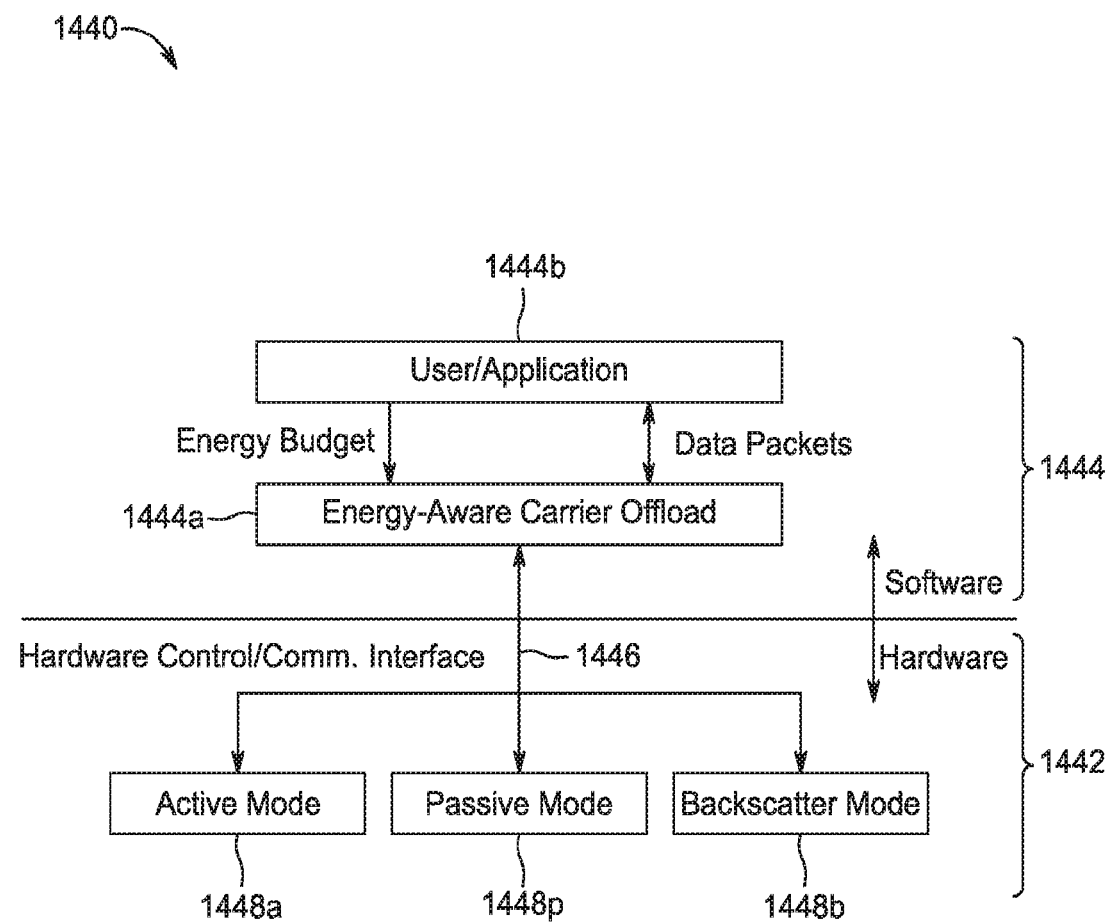
Figure 15:
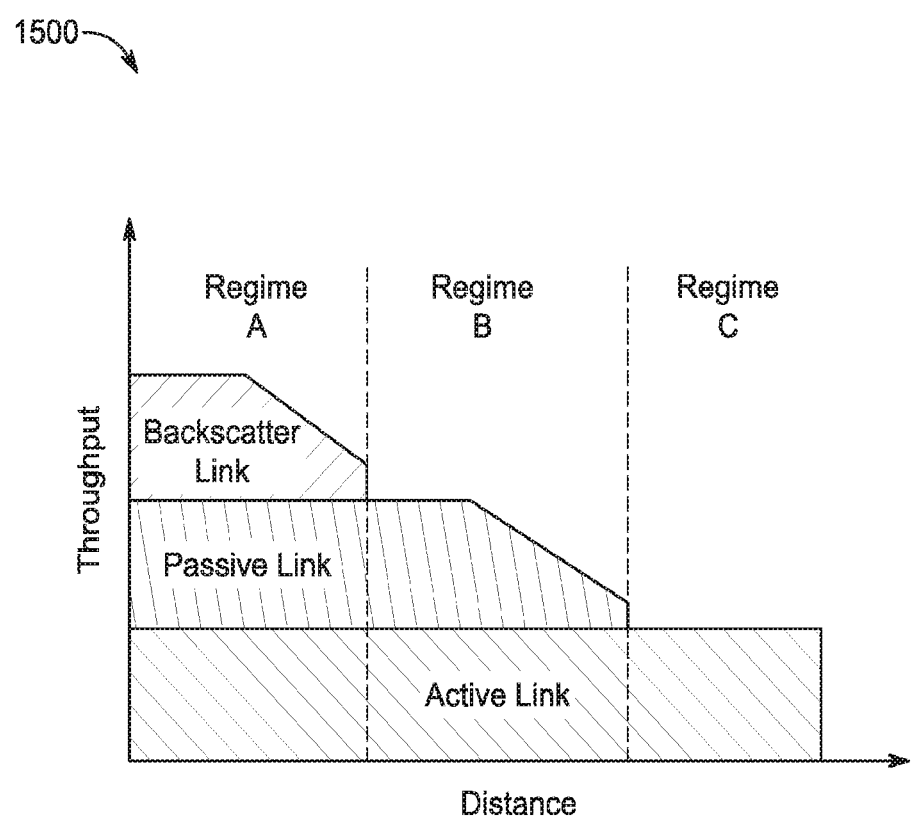
Figure 16:
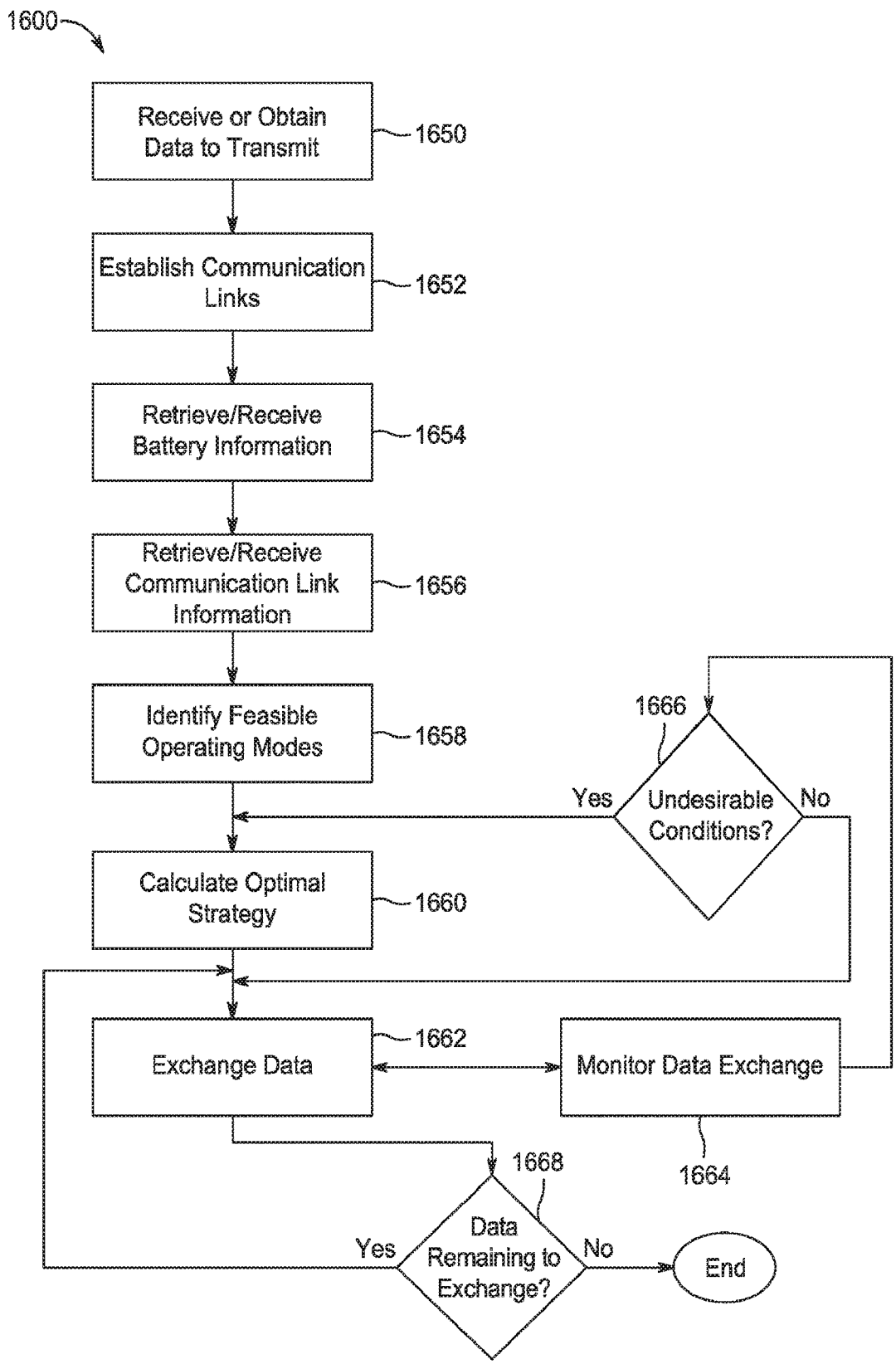
Figure 17:
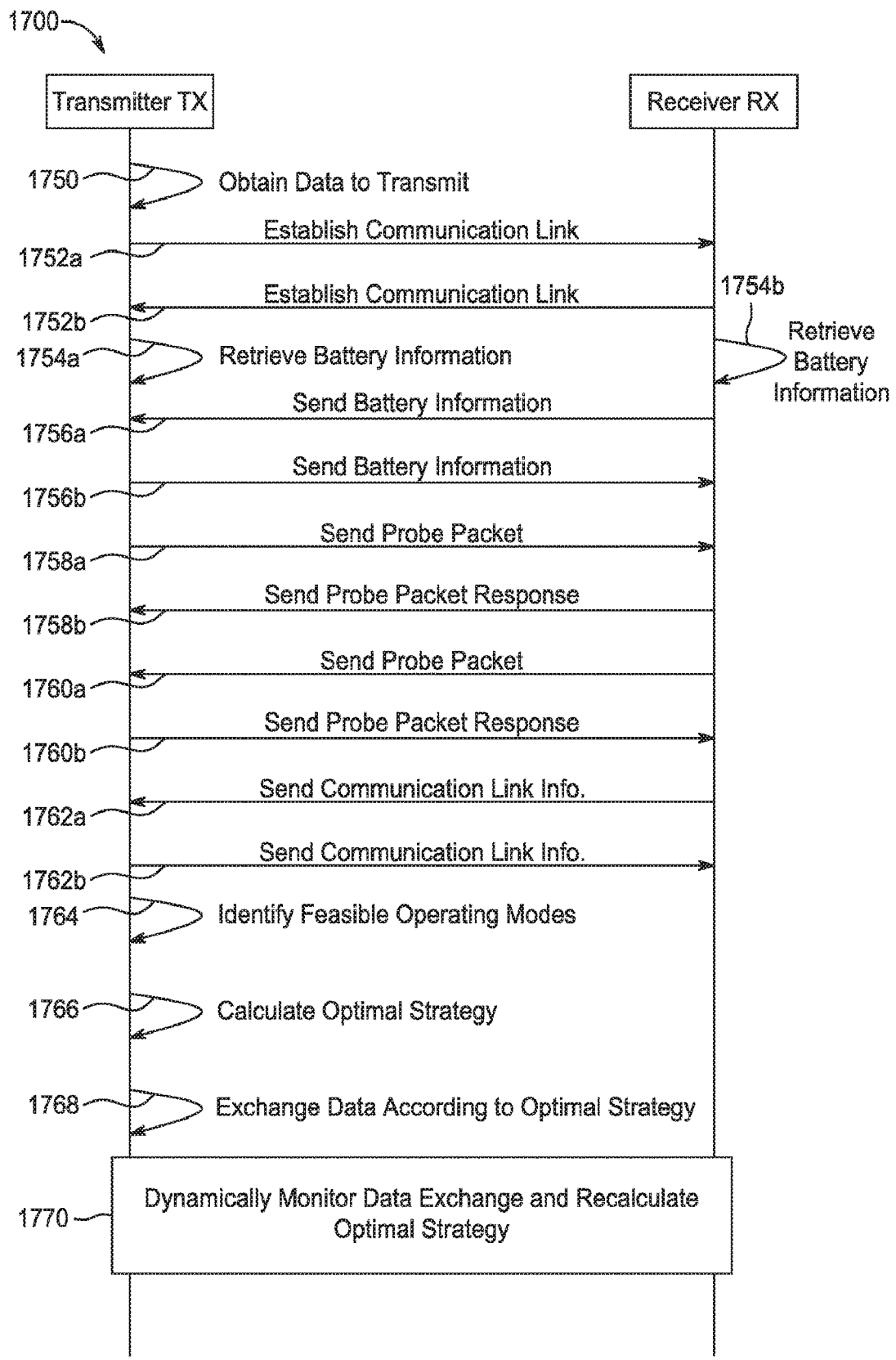
Figure 18:
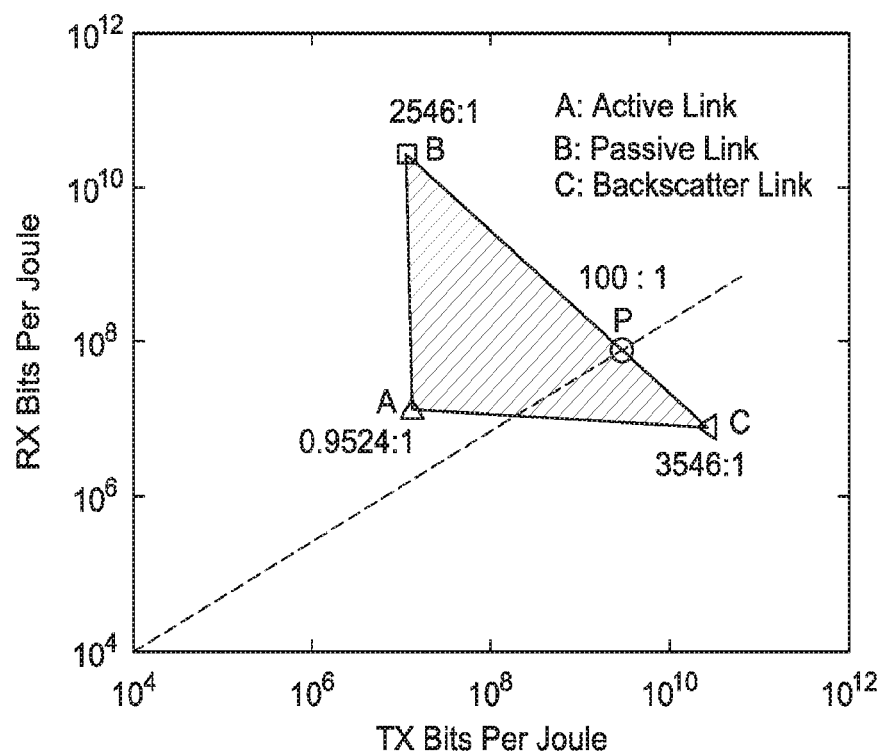
Figure 19:
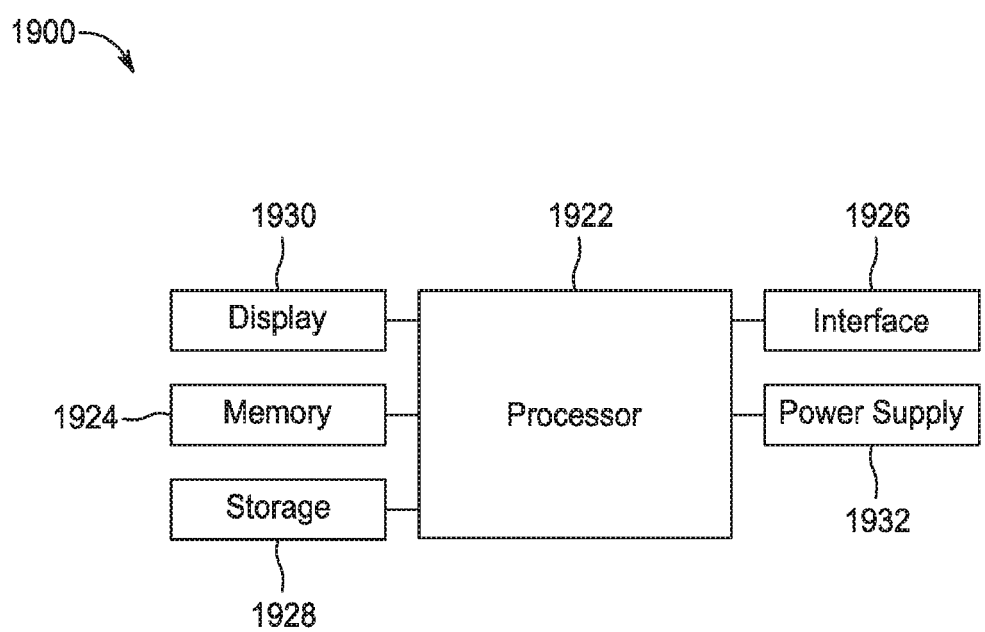

TM-A is a perspective view of one exemplary embodiment of a transmitter capable of transmitting a carrier signal, the transmitter being a smartwatch;

TM-A-INT is a schematic block diagram of some exemplary components of an integrated radio included as part of the transmitter of TM-A;

TM-B is a front view of another exemplary embodiment of a transmitter capable of transmitting a carrier signal, the transmitter being a smartphone;

REC-A is a front view of one exemplary embodiment of a receiver capable of receiving a carrier signal, REC-A-INT is a schematic block diagram of some exemplary components of an integrated radio included as part of the receiver of REC-A; and REC-B is a perspective view of another exemplary embodiment of a receiver capable of receiving a carrier signal, the receiver being a smartwatch;

FIG. 2 is a schematic electronic diagram of one exemplary embodiment of an active radio architecture in which both a transmitter and a receiver are configured to operate with active radio functionality;

FIG. 3 is a schematic electronic diagram of another exemplary embodiment of an active radio architecture in which both a transmitter and a receiver are configured to operate with active radio functionality;

FIG. 4 is a schematic electronic diagram of one exemplary embodiment of a passive radio architecture in which a transmitter is configured to operate with active radio functionality and a receiver is configured to operate with passive radio functionality;

FIG. 5 is a schematic electronic diagram of another exemplary embodiment of a passive radio architecture in which a transmitter is configured to operate with active radio functionality and a receiver is configured to operate with passive radio functionality;

FIG. 6 is a schematic electronic diagram of yet another exemplary embodiment of a passive radio architecture in which a transmitter is configured to operate with passive radio or backscatter functionality by way of a backscatter tag and a receiver is configured to operate with active radio or backscatter functionality, in essence a backscatter reader;

FIG. 7 is a schematic electronic diagram of still another exemplary embodiment of a passive radio architecture in which a transmitter is configured to operate with passive radio or backscatter functionality by way of a backscatter tag and a receiver is configured to operate with active radio or backscatter functionality, in essence a backscatter reader;

FIG. 8 is a schematic electronic diagram of one exemplary embodiment of a passive radio architecture in which a receiver is configured to operate with active radio or backscatter functionality, in essence a backscatter reader;

FIG. 9A is a top view of one exemplary embodiment of an integrated radio;

FIG. 9B is a bottom view of the integrated radio of FIG. 9A;

FIG. 10 is a schematic electronic diagram of one exemplary embodiment of a receiver configured to operate with passive radio functionality, the diagram including a SAW filter as a portion of the receiver;

FIG. 11 is a schematic electronic diagram of one exemplary embodiment of a single-stage charge pump electronic circuit configured to be used as part of a passive reader of an integrated radio;

FIG. 12 is a schematic electronic diagram of one exemplary embodiment of an antenna switching module configured to be used as part of an integrated radio;

FIG. 13 is a schematic block diagram of one exemplary embodiment of an integrated radio;

FIG. 14 is a schematic block diagram of one exemplary embodiment of a layer architecture for a computing device that includes an integrated radio;

FIG. 15 is a chart illustrating feasible communication distances between two computing devices based on a throughput under each of three operating modes-active, passive, and backscatter—for one exemplary embodiment of computing devices in which at least one includes an integrated radio;

FIG. 16 is a flowchart illustrating one exemplary embodiment of a carrier offload algorithm;

FIG. 17 is a sequence diagram illustrating one exemplary embodiment for executing the carrier offload algorithm of FIG. 16;

FIG. 18 is a chart illustrating a power efficiency of one exemplary embodiment of transmitter relative to a power efficiency of one exemplary embodiment of a receiver; and FIG. 19 is a schematic block diagram of one exemplary embodiment of a computer system for operating the carrier offload algorithm of FIG. 16, among other disclosures and features provided for herein.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, in the present disclosure, like-numbered components of various embodiments generally have similar features when those components are of a similar nature and/or serve a similar purpose. Still further, to the extent electronic circuits and other diagrams are provided for in the present disclosure, a person skilled in the art, in view of the present disclosures, will understand a plethora of different ways by which the same purpose or functions can be achieved using different components and configurations of an electronic circuit. The illustrated circuits and other diagrams are in no way limiting of the types of set-ups that can be used to perform the various electronic functions, such as transmitting a signal, shifting a frequency of that signal, and receiving the frequency-shifted signal. Additionally, in a number of instances, various terms understood or otherwise known to those skilled in the art are used interchangeably, including, by way of non-limiting example, terms such as "power," "energy," and "battery."

The systems and methods provided for in the present disclosure allow for devices connected in a computer device ecosystem to communicate wirelessly in a manner that can dynamically split the power burden on the interconnected devices. The power burden can be split in proportion to the power or energy available on the devices. The described systems and methods employ an integrated radio, or "Braidio," that is low-power and low-cost, and is capable of operating as an active and passive transceiver. Additional details about the Braidio are provided below, after first describing a computing device ecosystem into which the provided disclosures can be incorporated, and discussing some traditional set-ups of active and passive radios, along with their capabilities to perform in a backscatter mode.

Computing Device Ecosystem

Figure 1:
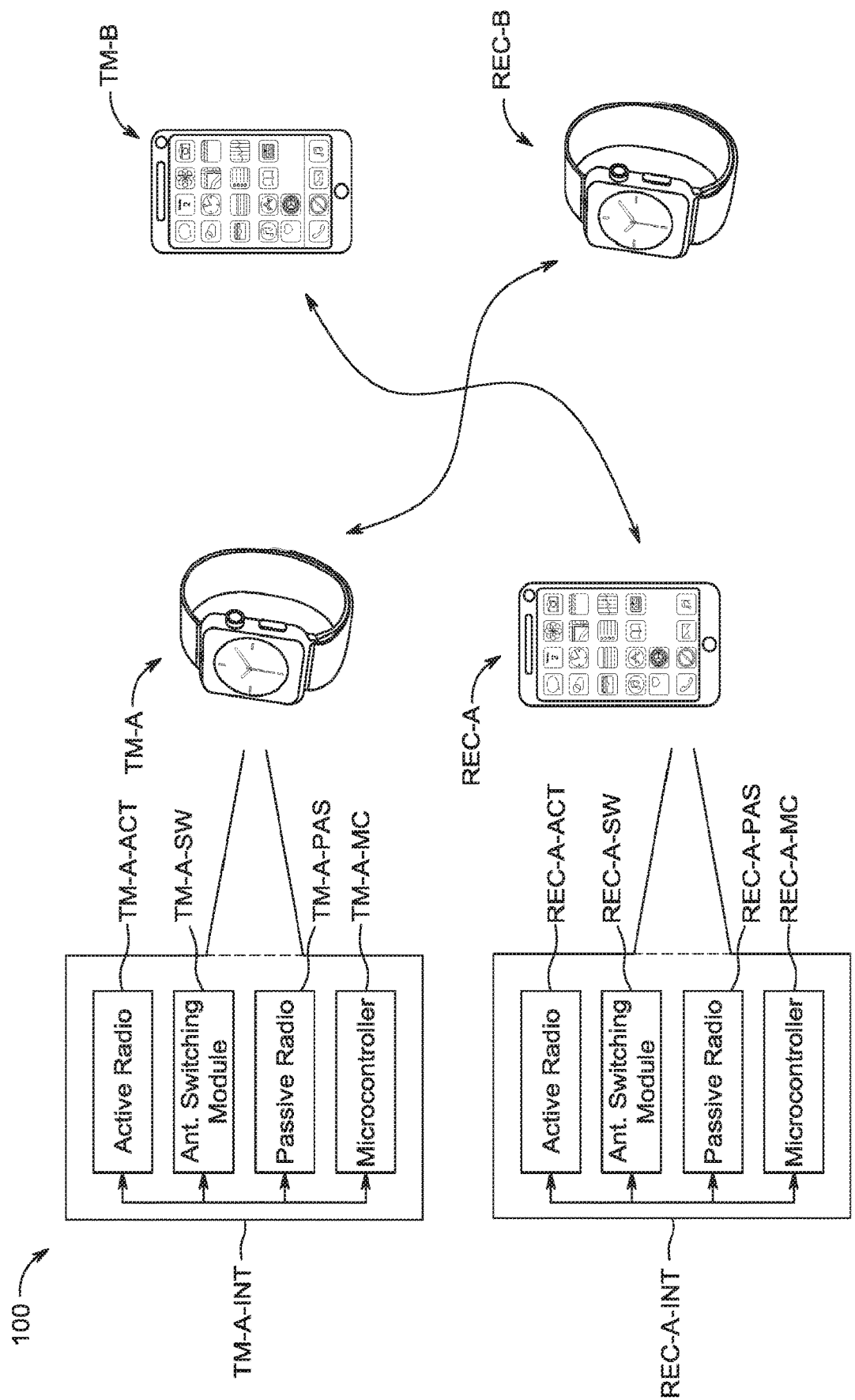
FIG. 1 is a schematic diagram of one exemplary embodiment of a computing device ecosystem, and includes the following non-limiting exemplary embodiments of devices in the computing device ecosystem.

FIG. 1 illustrates an exemplary embodiment of a computing device ecosystem 100 in which the present disclosures related to managing and optimizing power consumption amongst a plurality of computing devices can be used. The ecosystem 100 includes a plurality of objects or devices capable of collecting, gathering, or otherwise generating data and transmitting that data to another location(s) and/or object(s)/device(s) that is (are) capable of receiving at least some portion of the transmitted data. It should be understood that the computing device ecosystem 100 can include any number and type of interconnected computer devices or other devices and/or locations (e.g., the cloud) capable of collecting, gathering, or otherwise generating and transmitting data. For example, the ecosystem 100 can refer to the Internet of Things (IoT), a home network, an office network, or any set of interconnected computing devices.

In the illustrated computing device ecosystem 100, data is transferred wirelessly, although some objects in a computing device ecosystem may be connected in a wired configuration. The computing devices in the ecosystem 100 can include devices that are capable of both transmitting and receiving data, such as various smart devices and sensors. In some instances, although a particular component (e.g., computer device) of a computing device ecosystem is capable of both transmitting and receiving data, only one of those functions may be operational at a time to achieve peak performance.

As shown, the illustrated devices TM-A and TM-B of FIG. 1 are transmitters 102, and the illustrated devices REC-A and REC-B of FIG. 1 are receivers 104. A person skilled in the art will recognize that devices such as transmitters can likewise be configured to be receivers, and devices such as receivers can likewise be configured to be transmitters. In fact, in the illustrated embodiments of FIG. 1, each of the provided transmitters 102 and receivers 104 are capable of operating as receivers and transmitters, respectively.

The exemplary transmitter TM-A is an activity tracker or fitness band (e.g., Fitbits® and Misfit Shines), and the exemplary transmitter TM-B is a smartphone (e.g., iPhones and Android phones). Further, the exemplary receiver REC-A is a smartphone (e.g., iPhones and Android phones), and the exemplary receiver REC-B is a smartwatch (e.g., Apple Watches and Samsung Gear watches). Any activity trackers, wearable devices, smartphones, smartwatches, computing devices, and tablets or the like capable of receiving and/or transmitting data can be used in conjunction with the present disclosures, as can other objects capable of being connected to the IoT. Components and devices such as activity trackers, smartphones, smartwatches, tablets, and the like can be generally referred to as "smart devices." A person skilled in the art will recognize other types of "smart devices" that exist and can be used in conjunction with the present disclosures in the capacity of a transmitter and/or a receiver. Often, smart devices, and thus the transmitters and receivers provided for the in the present disclosure, include one or more sensors that allow data to be collected, gathered, or otherwise generated, and the data can then be wirelessly transmitted and/or received. Moreover, smart devices can be equipped with one or more processors, memories, and components configured to allow for wireless communication with other devices that are part of the ecosystem 100.

Smart devices can be configured to communicate with other objects, devices, locations (e.g., the cloud), and the like of the computing device ecosystem 100 using any number of wireless data transfer techniques known to those skilled in the art. In some embodiments, the communication means include an integrated radio (also referred to as a "Braidio") that integrates the functionality of active and passive radios and radio architectures. Active and passive radio functionalities are described in further detail below in connection with at least FIGS. 1-8. The present disclosures primarily focus on an integrated radio that communicates using Bluetooth (or Bluetooth Low Energy (BLE)) as its communication means, and also provides for Wi-Fi as an alternate communication means, but other ways of communication can also be used in conjunction with the present disclosures, including ZigBee, industrial, scientific, and medical (ISM)-radio bands, and others known to those skilled in the art.

Active and Passive Radio Configurations

The devices TM-A, TM-B, REC-A, and REC-B illustrated in FIG. 1 each include a respective integrated radio, also referred to as an interleaved radio, a braided radio, or a "Braidio." As shown in FIG. 1, the device TM-A includes an integrated radio TM-A-INT that includes a passive radio TM-A-PAS and an active radio TM-A-ACT, or alternatively, the integrated radio TM-A-INT is configured with the functionality of both a passive radio and an active radio. Likewise, the device REC-A includes an integrated radio REC-A-INT that includes a passive radio REC-A-PAS and an active radio REC-A-ACT, or alternatively, the integrated radio REC-A-INT is configured with the functionality of both a passive radio and an active radio. It should be understood that although an integrated radio is included in each of the devices illustrated in FIG. 1, only the integrated radio corresponding to devices TM-A and REC-A have been illustrated for exemplary purposes.

As explained in further detail herein, the active radios and passive radios of the devices (or functional equivalents) can be programmed to be turned on an off, as needed, to distribute power consumption during a data transmission between a transmitter and a receiver. These power consumption operating modes include (1) an active mode (e.g., FIGS. 2 and 3), in which power consumption is symmetrically distributed (or substantially symmetrically distributed) between the transmitter and the receiver; (2) a passive or passive-reader mode (e.g., FIGS. 4 and 5), in which power consumption is asymmetrically distributed such that the transmitter consumes more power than the receiver; and (3) a backscatter mode (e.g., FIGS. 6 and 7), in which power consumption is asymmetrically distributed such that the receiver consumes more power than the transmitter.

Still with reference to FIG. 1, the illustrated devices include microcontrollers TM-A-MC and REC-A-MC, and antenna switching components or modules TM-A-SW and REC-A-SW. As explained in further detail herein, the microcontrollers execute algorithms to determine a strategy for using active and passive functionalities of the integrated radios. That is, the microcontrollers can dynamically determine which power consumption modes to use at which times during a data exchange, and can instruct their respective antenna switching components to switch between antennas to transition between power consumption modes. Further, additional components and/or architectures of the integrated radios TM-A-INT and REC-A-INT can also be provided. Some such components and/or architectures are described below, and other such components and/or architectures are determinable by a person skilled in the art in view of the present disclosures.

Active Radio Architecture

In active radio architectures, a transmitter and a receiver are equipped with active radios and/or configured with their functionality. These active radios can be, for example, Bluetooth (or Bluetooth Low Energy (BLE)) and/or Wi-Fi radios and antennas. FIG. 2 illustrates one exemplary embodiment of an active radio architecture 200 including exemplary electronic circuits of an active radio 202a on a transmitter ("Active TX") and an active radio 204a on a receiver ("Active RX"). In FIG. 2, the transmitter and the receiver operate in an active power consumption mode, in which both devices use the same (or substantially the same) amount of power to transmit data.

In an active radio architecture, such as the one illustrated in FIG. 2, the active radio 202a of the transmitter can generate a carrier signal (e.g., a 2.4 MHz or 915 MHz carrier) using a carrier generator 210, can phase shift the carrier, for instance by way of a modulator 212, can pass the shifted carrier through mixers 214, 216 to generate In-phase (I) and Quadrature (Q) signals, respectively, and can amplify the signals via a power amplifier 218 before transmitting the signals to the receiver, via an antenna 220. As shown, the mixer 214 can generate the In-phase (I) signal after receiving data from an In-phase (I) channel 222 that can first be passed through a low-pass filter 224, and the mixer 216 likewise can generate the Quadrature (Q) signal after receiving data from a Quadrature (Q) channel 226 that can first be passed through a low-pass filter 228. On the receiver side, as illustrated, the active radio 204a of the receiver can receive the signal from the transmitter via an antenna 250, and the received signal can be amplified using a low-noise amplifier 248. The signal can be mixed via mixers 244, 246 with a carrier signal that is generated by the receiver. More particularly, the receiver can generate its own carrier signal using its own carrier generator 240, and can phase shift the carrier, for instance by way of a modulator 242, before passing the phase shifted carrier into the mixers 244, 246 for mixing with the received signal from the transmitter. As shown, the mixer 244 can direct the resulting signal through a low-pass filter 254 and then recover the I signal at an In-phase (I) channel 252, while the mixer 246 can direct the resulting signal through a low-pass filter 258 and then recover the Q signal at a Quadrature (Q) channel 256.

Using active radios such as radios 202a and 204a in an active power consumption mode as shown in FIG. 2 results in symmetric power consumption between a transmitter and a receiver, meaning that the transmitter and the receiver use equal or substantially equal (e.g., within about 30% or less, or within a transmitter to receiver power ratio of approximately within about 0.8:1 to about 1.6:1) amounts of power to transmit and receive data, respectively. In other words, the transmitter and receiver consume approximately the same amount of power, regardless of their power capacities or availabilities, to transmit and receive a certain amount of bits. Symmetric power consumption by the transmitter and the receiver is due to the transmitter and the receiver both implementing a carrier generator and generating the carrier signal, and employing components (e.g., modulator, demodulator) that consume similar amounts of power.

FIG. 3 illustrates another exemplary embodiment of an active radio architecture 300, in which an active radio 302a of the transmitter "Active TX" and an active radio 304a of the receiver "Active RX" generate carrier signals. As shown, the carrier signal of the transmitter can be generated by a sinusoidal generator 310, which in the illustrated embodiment has a frequency of 2.4 GHz, although other frequencies for the signal are possible. The signal can then be passed to a mixer 314, where it can be mixed with a received baseband. The mixed signal can then be amplified, for instance by way of an amplifier 318 (e.g., a power amplifier), and then transmitted to the receiver, via an antenna 320. Likewise, on the receiver side, the active radio 304a of the receiver can receive the signal from the transmitter via an antenna 350, and the received signal can be amplified using an amplifier 348 (e.g., a low-noise amplifier). The signal can be mixed via a mixer 344 with a carrier signal that is generated by the receiver. More particularly, the receiver can generate its own carrier signal using its own sinusoidal generator 340, and the mixer 344 can mix the generated carrier signal with the received signal from the transmitter. In the illustrated embodiment, the frequency of the generated carrier signal is 2.4 GHz, although other frequencies are possible. The mixer 344 can then direct the resulting signal to the baseband for recovery of the same. Similar to the architecture 200 illustrated in FIG. 2, the result of this architecture is that the transmitter and the receiver consume a symmetric (or substantially symmetric) amount of power.

Passive Radio Architecture

In passive radio architectures, traditionally, transmitters and receivers are configured such that communications result in an asymmetrical consumption of power, in which either the transmitter or the receiver consumes more power than the other. FIG. 4 illustrates one exemplary embodiment of a passive radio architecture 400 including exemplary electronic circuits of an active radio 402a on a transmitter ("Active TX") and a passive, low power radio 404p on a receiver ("Passive RX"). In FIG. 4, the transmitter and the receiver operate in a passive or passive-receiver power consumption operating mode, in which the transmitter consumes more power than the receiver. This is at least because the active radio 402a of the transmitter generates the carrier signal while the passive radio 404p does not generate a carrier signal. Instead the passive radio 404p receives the carrier signal from the transmitter 402a. For instance, the passive radio 404 includes an envelope detector 460 that consumes zero (or substantially zero) power.

More particularly, the active radio 402a includes components akin to the components described above with respect to the active radio 202a. Accordingly, each of the carrier generator 410, modulator 412, mixers 414 and 416, power amplifier 418, antenna 420, In-phase (I) channel 422, low-pass filter 424, Quadrature (Q) channel 426, and low-pass filter 428 operate in a similar manner to their counterpart components in the active radio 202a. On the receiver side, as illustrated, the passive radio 404a of the receiver can receive the signal via an antenna 450, which in turn can be directed to the envelope detector 460. As shown, the envelope detector 460 includes a rectifying diode 462 in combination with a capacitor 464 to boost voltage of a weak signal, a passive RC circuit 466 that includes two passive resistors 468, 470 and a passive capacitor 472 to construct a low pass filter that removes high frequency signals, and a comparator 474 to compare the signal voltage boosted by the combination of the rectifying diode 462 and the capacitor 464 with the signal voltage from the passive RC circuit 466 and output the difference of or between the two signals. The outputted signal is then directed to the baseband for recovery of the same.

FIG. 5 illustrates another exemplary embodiment of a passive radio architecture 500 including exemplary circuits of an active radio 502a on a transmitter "Active TX" and a passive, low-power radio 504p on a receiver "Passive RX." As shown, the active radio 502a of the active transmitter generates the carrier signal and transmits it to the passive radio 504p of the passive receiver. The active radio 502a includes components akin to the components described above with respect to the active radio 302a. Accordingly, each of the sinusoidal generator 510, mixer 514, amplifier 518, and antenna 520 operate in a similar manner to their counterpart components in the active radio 302a. The architecture of the passive radio 504p on the receiver side is more basic than the architecture provided with respect to the passive radio 404a. As shown, the passive radio 504p can receive the signal from the transmitter via an antenna 550, and the received signal can be directed to an envelope detector 560. The envelope detector 560 can include a rectifying diode 562 in combination with a capacitor 564 to boost voltage of a weak signal, and a resistor 568. The boosted voltage signal can be passed through to the baseband for recovery of the same. Similar to the architecture 400 illustrated in FIG. 4, the result is that the transmitter consumes a larger amount of power than the receiver.

FIG. 6 illustrates another exemplary embodiment of a passive radio architecture 600 including exemplary electronic circuits of a backscatter transmitter 602b on a transmitter ("Backscatter TX") and a backscatter reader 604b on a receiver ("Backscatter RX"). In some embodiments, the backscatter transmitter 602b can be or include the functionality of a backscatter tag such as a radio frequency (RF) tag. In FIG. 6, the transmitter and the receiver operate in a backscatter power consumption operating mode, in which the receiver consumes more power than the transmitter because, among other reasons, the backscatter reader 604b of the receiver generates the carrier signal while the backscatter tag 602b of the transmitter does not generate a carrier signal.

As described in further detail below, a backscatter tag 602b functioning as a backscatter transmitter provides low-power transmission by shifting power burdens to the backscatter reader 604b. That is, as illustrated in FIG. 6, the backscatter reader 604b takes on much of the complexity and power burden by generating the carrier signal and transmitting it to the backscatter tag 602b. As shown, a carrier generator 610 can generate a carrier signal (e.g., a 2.4 MHz or 915 MHz carrier), the signal can be amplified by a power amplifier 618, and the amplified signal can be transmitted to the transmitter, via an antenna 620.

The backscatter tag 602b of the transmitter can include an antenna 680 for receiving the signal transmitted by the antenna 620. The antenna 680 also reflects the carrier signal back to the reader 604b. The tag 602b can include a switch 682 associated with an RF transistor 684 so that the tag can selectively tune and detune the antenna 680 to modulate the incident carrier provided by the reader. The backscatter reader 604b observes this on-off backscatter pattern and can decode the signal. In some embodiments, the RF transistor 684 can be modulated by a low-frequency clock operating at a few tens of kHz for amplitude-shift keying (ASK) modulation, and around several MHz for frequency-shift keying (FSK) modulation. In still other embodiments, backscatter tag and reader components provided for in conjunction with the present disclosures can be designed to enable frequency-shifted Backscatter, as described in greater detail in U.S. patent application Ser. No. 15/31,142, entitled "Systems and Methods for Backscatter Communication," filed Jun. 23, 2017, the content of which is incorporated by reference herein in its entirety.

As shown, the architecture of the portion of the reader that receives the signal from the tag 602b can include components akin to the components described above with respect to the active radio 204a. Accordingly, each of the antenna 650, the low-noise amplifier 648, the mixers 644 and 646, carrier generator 640, modulator 642, low-pass filters 654 and 658, In-phase (I) channel 652, and Quadrature (Q)

channel 656 operate in a similar manner to their counterpart components in the active radio 204a.

Because the backscatter tag merely reflects the signal by way of an on-off backscatter pattern, the tag 602b need not be equipped with power hungry components such as a carrier generator, mixer, and/or low-noise-amplifier typically provided in active radios.

FIG. 7 illustrates another exemplary embodiment of a passive radio architecture 700 including exemplary electronic circuits of a backscatter transmitter or tag 702b and a backscatter reader 704b. In FIG. 7, the transmitter and the receiver operate in a backscatter power operating mode, in which the reader consumes more power than the transmitter due to, for example and among other things, the backscatter reader 704b generating the carrier signal while the backscatter tag 702b of the transmitter does not generate a carrier signal.

As shown, the reader 704b can include a sinusoidal generator 710, which in the illustrated embodiment has a frequency of 2.4 GHz, although other frequencies for the signal are possible. The carrier signal can be directed to a power amplifier 718, and then transmitted to the backscatter tag 704b via an antenna 720. The tag 702b of the transmitter can include an antenna 780 for receiving the signal transmitted by the antenna 720. The antenna 720 also reflects the carrier signal back to the reader 704b. The tag 702b can include a switch 782 associated with an RF transistor 784, which can operate in a manner akin to the switch 782 and RF transistor 684 of the tag 602b.

The signal that is reflected back by the antenna 720 can be received by the antenna 750. The signal can then be passed through a low-noise amplifier 748, and into a mixer 744. The mixer can mix the received, amplified signal from the tag 702b with a carrier signal generated by the sinusoidal generator 710, and then output the signal to the baseband for recovery of the same.

Traditional backscatter readers such as readers 604b and 704b are bulky and consume large amounts of power, particularly relative to backscatter tags such as tag 602b and 702b, as shown in exemplary Table 1:

TABLE 1

| Model | Total Power Consumption | Estimated backscatter reader power consumption | Cost |
|---|---|---|---|
| 1 | 0.64 W @ 17 dBm | 0.25 W | $397 |
| 2 | 0.73 W @ 20 dBm | 0.26 W | $303 |
| 3 | 1 W @ 12 dBm | 0.88 W | $419 |
| 4 | 1 W @ 12 dBm | 0.95 W | $500 |
| 5 | 4.2 W @ 17 dBm | 4.0 W | $398 |
| 6 | 2.5 W @ 23 dBm | 2.5 W | $285 |

Table 1 above illustrates the power consumption and cost of various exemplary commercial backscatter readers. The large power consumption of traditional backscatter readers is due to the methods used to deal with self-interference that is caused by the carrier signal generated by the backscatter reader for the backscatter tag that can overwhelm a weaker backscattered signal.

FIG. 8 illustrates an exemplary embodiment of an architecture 800 including exemplary electronic circuits of a backscatter reader 804b. Many of the components of the reader 804b are akin to counterpart components of the reader 704b, including a sinusoidal generator 810, a power amplifier 818, an antenna 820, an antenna 850, a low-noise amplifier 848, and a mixer 844. As illustrated in FIG. 8 though, signal leakage between the receiving and transmitting ends of the reader 804b (e.g., proximate to the antennas 820 and 850) can lead to undesirable interference when the low-noise amplifier 848 amplifies the signal received from a tag (e.g., the tag 702b). As known to those of skill in the art, examples of methods used by backscatter readers to deal with self-interference include (1) isolating the carrier signal from the receiver; (2) attenuating the self-interference using RF cancellation, and (3) separating the self-interference signal by converting it into DC voltage. More specifically, isolation methods use multiple antennas or RF devices called directional couplers to isolate the carrier signal. RF cancellation involves the reader generating a cancellation signal and adding it to the received signal. Converting the signal to baseband directional (e.g., Zero-IF) requires using a mixer with a local oscillator working at exactly the carrier frequency (and hence self-interference frequency), and converting the signal to baseband in a single frequency conversion.

These techniques for dealing with self-interference require significant amounts of power consumption though. For example, directional couplers introduce insertion loss and increase transmit power in order to maintain a same output power. RF cancellation requires an accurate estimate of the amplitude and phase of the interference signal, which requires frequent channel measurement and extensive communications. In addition, the cancellation signal is generated by the receiver, which consumes significant amounts of power (e.g., tens of mW) of power. Direct conversion to baseband also requires carrier generating, mixing and various filters which consume a significant amount of power (e.g., 60 mW). The integrated radio described below addresses the leakage issue in a much more power-efficient and low-power manner. Additional benefits also result from the integrated radio.

Integrated Radio or "Bradio"

In some embodiments described herein, an integrated radio is configured such that asymmetric power consumption can be achieved, for example, by providing improved signal sensitivity at a low power cost. The radio is integrated because it can operate the active, passive, and backscatter modes. The modes can behave in the manners described herein, and/or they can be modified in view of the disclosures provided herein for modifying some of the traditional active, passive, and/or backscatter modes.

FIGS. 9A and 9B illustrate top and bottom views, respectively, of an exemplary embodiment of a circuit board configured as an integrated radio 900. As illustrated, the circuit board can be a printed circuit board (PCB) 901 or the like having a microcontroller 903 and an active radio 902 (e.g., Bluetooth or BLE module, Wi-Fi module, etc.) disposed on its back side. The top side of the PCB of the integrated radio 900 includes a passive receiver module 904, a baseband amplification circuit 910, an antenna switching module 920, three chip receiver antennas 930a, 930b, and 930c, and corresponding filters (e.g., high-pass filter 940, surface acoustic wave (SAW) filter 950 (e.g., 902-928 MHz SAW filter)). As illustrated, the components of the integrated radio 900 are interconnected using UFL connectors 970 and RF cables 972. These components of the integrated radio 900 are configured to improve device sensitivity at a reduced power consumption relative to traditional active and passive radios. In this way, traditional passive readers can be configured to provide improved sensitivity in passive and backscatter communications.

The SAW filter 950 can be useful in allowing the integrated radio 900 to be selective in the frequencies that the passive receiver module 904 allows to pass through to the baseband for recovery. Typical envelope detectors that are used in a passive mode, like the envelope detector 460 of FIG. 4 and the envelope detector 560 of FIG. 5, are not frequency selective, meaning that any frequency received via an antenna can be passed to the envelope detector. This results in undesirable interference, as out-of-band interference coming from a smartphone or Wi-Fi router can trigger the envelope detector, leading to poor reception.

FIG. 10 illustrates an exemplary embodiment of an architecture 500' including an exemplary electronic circuit that is a modified version of the electronic circuit for the passive, low-power radio 504p on the receiver Passive RX of an integrated radio. The modified electronic circuit is identified as a passive, low-power radio 504p'. As shown, the passive radio 504p' includes an antenna 550' and an envelope detector 560', the envelope detector 560' having a rectifying diode 562' in combination with a capacitor 564', and a resistor 568', and each of which operate in a manner similar to the counterpart components described with respect to the radio 504p above. Further, a baseband amplifier 569' is provided after the envelope detector 560', or alternatively as part of the envelope detector 560', to boost the signal that is passed to the baseband by the envelope detector 560'. A person skilled in the art will appreciate that such an amplifier can also be used in conjunction with the envelope detector 560 of FIG. 5, among other configurations provided for or otherwise derivable from the present disclosures.

A SAW filter 950' is disposed prior to the envelope detector 560' to filter certain frequency ranges from the envelope detector 560', and thus decreasing or even eliminating the impact of out-of-band interference that results from a smart phone, Wi-Fi router, and/or other components of a computing device on which the integrated radio is provided or that are in the vicinity of the integrated radio. In one exemplary embodiment, the SAW filter 950' is a 902-928 MHz SAW filter, meaning that only frequencies within that range are permitted to pass to the envelope detector 560'. Other ranges for SAW filters can be used, and the parameters for determining the range of the SAW filter can depend on a variety of factors, including but not limited to the computing device with which the integrated radio is being used, the signal frequencies in the surrounding vicinity, and the other components of the electronic circuitry of the integrated radio. In traditional passive radios, such interference is minimized by way of a mixer and a low-pass filter, but the SAW filter is used in exemplary embodiments of integrated radios provided for herein at least because the SAW filter does not consume any power, whereas a combination of a mixer and low-pass filter can consume a high level of power (e.g., tens of milliwatts of power). For example, in some instances, directly converting a signal to baseband using carrier generation, mixing, and various filters can consume roughly 60 milliwatts of power.

FIG. 11 provides for one exemplary embodiment of an architecture 1000 including an exemplary, single-stage charge pump electronic circuit 1090 that can be used as part of a passive reader 1004p of an integrated radio. The charge pump circuit 1090 can boost the voltage of a weak signal received by the reader 1004p, for example via an antenna (not shown), while also blocking large but relatively constant carrier self-interference signals from passing through the rest of the reader, for example from passing through to the baseband for recovery of the signal.

The charge pump circuit 1090 can extract an envelope of the dynamic RF signal received, for example, from a tag, and convert it into DC voltage. As shown, the circuit 1090 includes a sinusoidal generator 1092 that passes through to several stages of a diode-capacitor configuration 1094 to output the DC voltage. In the illustrated embodiment, the diode-capacitor configuration 1094 includes two capacitors 1095, 1097 and two diodes, as shown Schottky diodes 1096, 1098, although a variety of types of capacitors and diodes, and different amounts and configurations of the same, can be used. As shown, the signal generated by the sinusoidal generator 1092 is passed across the first capacitor 1095, after which the first Schottky diode 1096 helps pass the signal to the second Schottky diode 1098. The second Schottky diode 1098 then passes the signal towards the second capacitor 1097, with the signal being output at output 1099 as a DC voltage that is greater than the voltage at the time the signal was generated by the sinusoidal generator 1092. In principle, the circuit 1090 can boost a signal by approximately 2N times where N is the number of stages of charge pump. Thus, in the illustrated embodiment, since the circuit 1090 is for a single-stage charge pump, when the sinusoidal generator 1092 provides a sine wave signal with an amplitude of about 1 volt, the charge pump circuit 1090 can generate a 2 volt DC voltage at the output.

The design of charge pump electrical circuit 1090 has ultra-low power consumption. The reader 1004p is entirely passive and, because it is excited by an incident RF signal, it requires no external power supply and consumers near-zero power draw. The reduced overall power consumption of this backscatter subsystem can thus operate at levels that are acceptable on mobile platforms. The design of the charge pump electrical circuit 1090 also prevents any self-interference problem because it converts self-interference to DC directly, and can be separated out from useful signal in frequency domain. This makes it possible to extract out the weak backscatter signal despite there being a large self-interference signal from the carrier transmitter.

A further improvement related to the charge pump electrical circuit 1090 can include the addition of an instrumental amplifier 1091. The output of the circuit 1090 can sometimes be low voltage, which can lead to low receiver sensitivity. For example, the increase afforded by a single-stage charge pump circuit like the circuit 1090 is not typically enough to bridge the gap to commercial, active receiver ICs. Typically, the signal amplitude has to be at least several millivolts for a comparator 1093 to generate the correct output, resulting in a sensitivity of around −40 dBm. Commercial, active receiver ICs, however, have a sensitivity of around −80 dBm. Providing the instrumental amplifier 1091 between the output 1099 of the charge pump circuit 1090 and the comparator 1093, which can operate in a manner akin to as described with respect to the comparator 474 or as otherwise known to those skilled in the art, improved sensitivity can be provided. The instrumental amplifier 1091 can reduce the output impedance that is increased by the charge pump circuit 1090 since it is passive and the output power cannot be larger than input power. The instrumental amplifier 1091 can be high impedance and low input capacitance to assist in properly tuning the circuit 1090 for use as described.

In traditional passive radios, a signal is often boosted by way of components like a low-noise amplifier, an intermediate frequency amplifier, and digital signal processing components, which can consume a high level of power. The charge pump electrical circuit, on the other hand, is used in exemplary embodiments of integrated radios provided for herein at least because the charge pump electrical circuit consumes substantially less power than the aforementioned components of traditional passive radios. For example, in some instances, traditional low-power radios consume about 20 milliwatts of power, while a charge pump circuit provided in accordance with the present disclosures consumes less than about 10 microwatts of power, making the charge pump circuit approximately 2000 times more energy efficient.

FIG. 12 schematically illustrates an antenna switching module 1181, which is a further feature that can be incorporated with an integrated radio. The antenna switching module 1181 allows for antenna diversity such that a different antenna can be used based on the module that is being operated by the integrated radio, e.g., active, passive, and/or backscatter. In the illustrated embodiment, the antenna switching module 1100 can direct a signal to path 1 to transmit the signal via an antenna 1150a, or path 2 to transmit the signal via an antenna 1150b. Other paths and antennas can also be used, including but not limited to three paths with three antennas. The switching module 1181 can be operated by any known switching means, including but not limited to a push button or momentary switch, and a microcontroller, such as the microcontroller 903, can provide the signal to cause the switching module 1181 to activate one or more of the antennas 1150a, 1150b. The decision as to which antenna(s) to activate can be based, for example, on the operating mode of the integrated radio at the time. For instance, in some exemplary embodiments, there can be at least three antennas, with each antenna being keyed to a different mode of operation, e.g., active, passive, and backscatter. As one or more modes are activated, their respective antennas can be activated to transmit signals. Although many different types of antennas can be used, in some exemplary embodiments the antennas are chip antennas.

Allowing for antenna diversity can improve the ability for an envelope detector, like the envelope detector 460 of FIG. 4 and the envelope detector 560 of FIG. 5, to resolve phase cancellation issues, which can result, for example, from instances in which the signal from a backscatter transmitter is orthogonal to a background signal (including self-interference). Envelope detectors can have difficulty decoding a signal in which only a phase of a signal, and not an amplitude, is changed because envelope detectors cannot typically detect phase. Further, by providing for multiple antennas, if signals from all paths are destructive at one antenna, one or more additional antennas may experience sufficiently different channel conditions to provide a better signal-to-noise (SNR) ratio.

In traditional passive radios, an IQ-based orthogonal receiver can be used to resolve phase cancellation issues. Such receivers can include two sets of mixers, filters, and intermediate frequency amplifiers, among other components, which can consume a high level of power. The antenna switching module 1100, on the other hand, is used in exemplary embodiments of integrated radios provided for herein at least because the module 1100 consumes substantially less power than an IQ-based orthogonal receiver of traditional passive radios. For example, each set of mixers, filters, and intermediate frequency amplifiers can consume about 10 milliwatts of power, while an antenna switching module provided in accordance with the present disclosures consumes about 3 microwatts of power, making the antenna switching module approximately 3000 times more energy efficient.

For example, in some instances, traditional low-power radios consume about 20 milliwatts of power, while a charge pump circuit provided in accordance with the present disclosures consumes less than about 10 microwatts of power, making the charge pump circuit approximately 3333 times more energy efficient.

FIG. 13 provides a block diagram of one embodiment of an integrated radio that incorporates at least some of the features described above. The features and benefits of such features and components will be well understood by a person skilled in the art in view of the earlier provided disclosures of such components, as well as the additional descriptions provided related to the carrier offload algorithm provided below.

As shown, the integrative radio 1200 includes an active radio component 1202a, a passive radio component 1204p, and a microcontroller 1203. These components can be part of any of the computing devices provided for herein, including but not limited to a smartphone, tablet, computer, wearable devices, etc. The microcontroller 1203 is operatively connected to each of the radio components 1202a, 1204p and can be configured to activate the different modes (e.g., active, passive, and backscatter) for each of the radio components 1202a and 1204p. Further, the microcontroller 1203 is operatively connected to the antenna switch 1281, which can allow the microcontroller 1203 to command the antenna switch 1281 to activate particular antennas, as shown antennas 1280a, 1280b, based on the radio modes activated by the microcontroller 1203. While the present embodiment illustrates two antennas 1280a, 1280b, in other embodiments there can be at least three antennas so there is one antenna per mode. As shown, each of the antennas 1280a, 1280b can include a band-pass filter 1253a, 1253b to assist with signal processing, as known to those skilled in the art. The antennas 1280a, 1280b can receive a signal, such as from a backscatter tag, and pass that signal to at least one of the passive and active radio components 1204p and 1202a.

The passive radio component 1204p includes a carrier emitter 1290 (e.g., a charge pump electrical circuit) and an envelope detector circuit 1260. The passive radio component 1204p feeds its signal to an instrumental amplifier 1291, which in turn feeds the amplified signal to a comparator 1293. Although not illustrated, in some embodiments, a SAW filter can be disposed between the carrier emitter 1290 and the envelope detector circuit 1260. After a signal has been processed by the integrated radio, it can be transmitted by way of a transmit antenna 1250.

The embodiments described above allow for a modular design for an integrated radio or Braidio. This is because the features provided for in the various architectures can be easily implemented into existing circuitry of existing computing devices in view of the present disclosures. Computing devices that have radio devices and/or functionalities need not be swapped out wholesale, but instead can be modified by adding particular features (e.g., components that provide for a backscatter tag, an antenna switching module, a charge pump, an amplifier, a SAW filter). Additionally, the provided for architectures generally result in electronic circuits that are less complex than circuits used in existing active and passive radios, which often results in less real estate being needed on a device. Further, a person skilled in the art, in view of the present disclosures, will appreciate that the modular design makes it easier to isolate errors and simplify debugging of the systems and devices. Likewise, by integrating active and passive components into a single radio with shared modules, switching between the modes can be easier since components are turned on and off a fewer amount of times.

Further, the embodiments provided for herein can support transmitter-receiver power ratios approximately in a range of about 1:3000 to about 1:4000, and more particularly approximately in a range of about 1:2546 to about 3546:1. The provided for architectures also enable a large dynamic range of asymmetry to suit a wide range of energy budgets between the end points. Still further, the overall power consumption of the provided designs is significantly lower than traditional radios that have active and/or passive capabilities. The provided for integrated radios can have a total power consumption of about 150 milliwatts or less, and in some embodiments the approximate power consumption range is between about 16 microwatts and about 129 milliwatts. Such ultra-low power consumption makes the provided for architectures suitable and practical for a range of mobile devices, ranging from laptops to smartwatches. Still further yet, the rate of data transmission provided for by the disclosed integrated radios and related features allow for total bit transmissions that are several orders of magnitude greater when compared with Bluetooth, which currently is a common methodology for akin data transfer. The difference in transmission rates achieved by the present disclosure in view of previous methods (e.g., Bluetooth, Wi-Fi, etc.) is particularly pronounced when there is significant asymmetry in battery levels between the two communicating computing devices.

Carrier Offload Algorithm

As described above, an integrated radio provided in a computing device includes hardware components that enable the use of various power consumption modes to exchange data with integrated radios in other computing devices. These power consumption modes allow power to be consumed in a manner that is proportional to the power availability, power capacity, and/or power efficiency of each of the computing devices.

FIG. 14 illustrates an exemplary embodiment of a layer architecture 1440 of a computing device including an integrated radio for providing power-proportional communication. As shown, the layer architecture includes a hardware layer 1442 and a software layer 1444. The hardware layer 1442 and software layer 1444 are configured to communicate using a hardware interface 1446, such as a hardware control or communication interface. For example, the hardware interface 1446 allows the software layer 1444 to control the hardware (e.g., by sending signals or commands) to, among other things, manipulate hardware components as needed to switch between power consumption operation modes in accordance with an optimal power consumption strategy calculated using a carrier offload algorithm such as the one described in further detail below.

The hardware layer 1442 includes various components and circuitry as described above in connection with FIGS. 1-13. Among other components, the hardware layer can include an integrated radio having any of a microcontroller, an active radio (or a component that has active radio functionality), a passive receiver module (alternately referred to as a passive radio or a component that has passive radio and/or receiver functionality), a baseband amplification circuit, an antenna switching module, antenna(s) (e.g., chip antenna(s), receiver antenna(s)), and SAW filters, as well as other components provided for herein or which could be included in an integrated radio based on the teachings of the present disclosure and knowledge of those skilled in the art. The components of the hardware layer 1442 allow the integrated radio to function and switch between various power consumption modes, including the active mode 1448a, the passive mode 1448p, and the backscatter mode 1448b, as indicated in FIG. 14. It should be understood that, in some embodiments, the naming scheme of the power consumption modes described herein refers to the operating state of the receiver.

In the active mode 1448a, the integrated radios of a transmitter and a receiver exchanging data operate like active radios. That is, the transmitter and a receiver generate respective carrier signals. The power consumption in the active mode 1448a is symmetric or substantially symmetric between the transmitter and the receiver, although slight deviation from full power consumption symmetry can be permitted. In the passive mode (or "passive receiver mode") 1448p, only the transmitter generates a carrier and the receiver uses, for example, a passive envelope detector to save power. As known to those of skill in the art, the envelope detector is a passive circuit that consumes zero (or substantially zero) power. As a result, the power consumption in the passive mode 1448p is asymmetric, such that the transmitter consumes more power than the receiver. For example, the transmitter can consume as much power as an active radio, while the receiver operating as a passive radio consumes minimal power. In the backscatter mode 1448b, only the receiver generates a carrier signal. That is, the transmitter shifts or offloads the carrier generation to the receiver in order to save power. The receiver thus consumes more power than the transmitter because it is generating and transmitting the carrier signal, as well as performing functionality to reduce or cancel self-interference and decoding. Moreover, in the backscatter mode 1448b, the transmitter can be or function as a backscatter tag, which is a low power component.

It should be understood that the three power consumption modes may differ in performance at least because each device (e.g., transmitter, receiver) has varying hardware components, path loss, reflection loss, and the like. As a result, each of the operating modes can have different signal-to-noise ratios, which in turn can cause differences in range and throughput. FIG. 15 is a chart 1500 illustrating the feasible communication distance (e.g., range) between devices (on the x-axis) and their throughput (on the y-axis) under each of the operating modes: active, passive, and backscatter. As illustrated, the active mode provides more throughput and range compared to the passive mode, while the passive mode has a higher throughput and range than the backscatter mode.

Still with reference to FIG. 14, the power consumption modes 1448a, 1448p, and 1448b can be activated by controlling the hardware to function in a manner that is in accordance with each of the modes. The hardware in the hardware layer 1442 can be controlled via software (or logic, algorithms, and the like) of the software layer 1444 among the layers of the computing device having an integrated radio. As illustrated, the software layer 1444 includes energy-aware carrier offload software 1444a or similar logic that implements a carrier offload algorithm or the like that determines and/or executes an optimal strategy for using and switching among the power consumption modes. In other words, to shift power burdens, the carrier-offload software 1444a enables dynamic offloading of the carrier generation among integrated radios of computing devices in a communication or data exchange, in accordance with the power availability of each of the computing devices. As known to those of skill in the art, generating a carrier signal requires a substantial amount of power consumption. Thus, the generation of the carrier signal and the substantial power consumed thereby is offloaded or switched from one device to another. The carrier offload algorithm implemented by the energy-aware carrier offload 1444a is described in further detail below with reference to FIGS. 15 to 18.

In some embodiments, the carrier offload software 1444a communicates with an applications 1444b (and, thereby, users), for example, to establish energy or power budgets and exchange other data, such as data to be communicated with other computing devices using the hardware of the hardware layer 1442. The application 1444b can be used to obtain or calculate energy or power budgets. The power budgets can include parameters, preferences, and other information indicating the manner in which toggling between the power consumption modes 1448a, 1448p, and 1448b is to be performed. For instance, the application can interface with a user to prompt for and receive the information to construct the power budgets transmitted to the energy-aware carrier offload software 1444a. For example, a transmitter computing device can obtain and/or calculate energy budgets indicating that the backscatter mode is not to be activated until the power availability of the transmitter is below 50%. This, and other energy budgeting information, can be transmitted between the applications 1444b and the energy-aware carrier offload software 1444a.

While the energy or power budgets transmitted to the energy-aware carrier offload software 1444a can be obtained from users via the applications 1444b, in some embodiments the energy budgets can be calculated using artificial intelligence, machine learning, or other automated technologies to arrive at optimal, suggested, and/or preferred energy budgets. Moreover, in some embodiments, the applications 1444b can be used to monitor information such as hardware data, and calculate the energy budgets based on the monitored information. For example, the application 1444b can sense that a subpar signal-to-noise ratio is occurring in a communication link between a specific transmitter and receiver. To this end, the applications 1444b can determine that the computing device is to remain in an active mode until the power availability of the computing device falls below a predetermined threshold amount.

Still with reference to FIG. 14, the applications 1444b can exchange data or data packets with the energy-aware carrier-offload software 1444a. For example, the data or data packets can include information to send to a receiver or information received from a transmitter. These data packets can therefore be or include the data that is to be sent in accordance with the results of the carrier offload algorithm.

FIG. 16 is a flowchart 1600 illustrating an exemplary embodiment of a carrier offload algorithm. As described above, in some embodiments, the carrier offload algorithm can be executed or implemented by software such as energy-aware carrier offload program 1444a of a computing device as illustrated in FIG. 14. The carrier offload algorithm illustrated in flowchart 1600 is used to calculate an optimal strategy for exchanging data between a transmitter and a receiver that each have an integrated radio configured to function in various power consumption or operating modes such as an active mode, passive mode, and backscatter mode. The optimal strategy can indicate or include information indicating the power consumption modes to use and the amounts of time and/or sequence in which to do so to achieve a power-proportional (or substantially power-proportional) power consumption between the transmitter and receiver.

As shown in FIG. 16, at step 1650, data to be transmitted to a receiver is received or obtained by a transmitter. It should be understood that the data can be any type of communicable data as known to those of skill in the art. In some embodiments, the data can be received from an application such as applications 1444b illustrated in FIG. 14. In turn, at step 1652, the transmitter and receiver respectively initiate or establish communication links with one another. Using their respectively established communication links, the transmitter and receiver send their respective battery information to one another at step 1654. The battery information includes, among other information, battery capacity and battery availability of a computing device. At step 1656, the transmitter and receiver measure or obtain communication link information corresponding to their respectively established communications. In some embodiments, the communication link information includes signal-to-noise ratio and bitrate parameters or data. Based on at least a portion of the battery information and the communication link information obtained at step 1654 and 1656, at step 1658, feasible operating modes are identified. It should be understood that feasible operating modes refer to those power consumption modes that are used to or enable achieving power-proportionality between the transmitter and receiver. In turn, at step 1660, an optimal strategy is calculated based on the identified feasible operating modes. As described in further detail below with reference to FIGS. 17 and 18, the optimal strategy can indicate the operating modes to be employed during the data exchange between the transmitter and receiver, and/or the amount of time and sequence order in which the operating modes are to be used during the data exchange. At step 1662, data is exchanged in accordance with the optimal strategy calculated at step 1660. In other words, data is transmitted from the transmitter to the receiver oscillating between the operating modes as dictated by the calculated optimal strategy.

During the data exchange according to the calculated optimal strategy, the transmitter and/or receiver may continuously and/or periodically monitor battery and communication link information, as indicated at step 1664. That is, the transmitter and the receiver request, retrieve, obtain, and/or receive battery and communication link information relating to the transmitter and the receiver. At step 1666, based on the battery and/or communication link information obtained at step 1664, a determination is made as to whether undesirable conditions are present in the data exchange. If so (YES), the carrier offload algorithm returns to step 1660, where an optimal strategy is calculated (e.g., recalculated) based on the battery and communication link information obtained during the monitoring of step 1664. The carrier offload algorithm continues to exchange data between the transmitter and receiver based on the newly calculated (e.g., recalculated) optimal strategy. On the other hand, if undesirable conditions are not identified at step 1664 (NO), the data exchange of step 1662 persists, and the continuous or periodic monitoring of the transmitter and receiver, performed at step 1664, does not cause any action (e.g., recalculation of optimal strategy) to be taken, instead allowing the data exchange of step 1662 to continue.

At step 1668, a determination is made as to whether data remains to be exchanged between the transmitter and the receiver. If so (YES), the carrier offload algorithm continues with the data exchange based on the previously calculated optimal strategy. On the other hand, if no data (NO) is left to be transmitted (e.g., the data exchange has been completed), the process ends.

The carrier offload algorithm described in connection with FIG. 16 is now described in further detail with reference to FIG. 17. FIG. 17 illustrates an exemplary embodiment of a sequence diagram 1700 for executing a carrier offload algorithm to power-proportionally exchange data between a transmitter TX and a receiver RX. It should be understood that the transmitter TX and receiver RX are computing devices equipped with integrated radios that provide active and passive radio functionality that enables the use of power consumption operating modes such as an active mode, a passive mode, and a backscatter mode.

At step 1750, the transmitter TX obtains data to transmit to the receiver RX. As known to those of skill in the art, the data to be transmitted can be data obtained from a user and/or data sensed by the transmitter computing device using a sensor component associated therewith. As a result of obtaining the data to be transmitted to the receiver RX, the transmitter TX and receiver RX each establish communication links with one another, at steps 1752a and 1752b. These communication links are physical and/or logical links or other communication channels connecting the transmitter TX and the receiver RX.

In turn, at steps 1754a and 1754b, the transmitter TX and the receiver RX, respectively, retrieve their battery information-namely the information relating to the battery powering the device. The battery information can include information related to the power of the transmitter TX and the receiver RX, including the available battery and battery capacity. As known to those of skill in the art, the transmitter TX and the receiver RX can retrieve their respective battery information by communicating with the battery and/or by retrieving it from memory. In turn, at steps 1756a and 1756b, the transmitter TX and the receiver RX transmit to each other, via their respectively established communication links, their retrieved battery information, such that each computing device can be aware of its own battery information as well as that of the computing device or devices with which it is linked and to exchange data. In some embodiments, the battery information is transmitted by the transmitter TX and the receiver RX, to the other, using their respective active radios and active radio functionality. As described in further detail below, the battery information can be used to develop or calculate an optimal power consumption strategy that is power-proportional, meaning that it consumes power-proportionally or substantially proportionally to the available battery of the transmitter TX and the receiver RX.

Still with reference to FIG. 17, the transmitter TX and the receiver RX obtain communication link information related to their respectively established communication links. Communication link information can include various types of data or parameters associated with a communication link, including, for example, the signal-to-noise ratio and the bitrate. The communication link information can be obtained or calculated for each of the power consumption operating modes.

It should be understood that, as known to those of skill in the art, it is possible to acquire information relating to a communication link in various ways. In some embodiments, such as the exemplary embodiment of FIG. 17, communication link information is obtained by sending probe packets and receiving response packets, responsive to the probe packets, over the communication link for which information is sought. Probe packets are active measurement tools used to collect or measure parameters of a communications link or channel between two devices. For example, at step 1758a, the transmitter TX sends a probe packet to the receiver RX, over the communication link established by the transmitter TX at step 1752a, to acquire information regarding that communication link. At step 1758b, the transmitter TX receives, over the same communication link established by the transmitter TX at step 1752a, a probe packet response including the communication link information. At steps 1760a and 1760b, the receiver RX similarly sends a probe packet to the transmitter TX and receives a probe pocket response therefrom. The probe packet and response sent at steps 1760a and 1760b are sent over the communication link established at step 1752b by the receiver RX.

In some embodiments, obtaining communication link information for each of the power consumption operating modes can be achieved by sending probe packets under each of the modes of communication. In other words, by way of example, for the transmitter TX to obtain communication link information associated with the active mode of power consumption, probe packets and responses can be sent using the active mode configuration in which the transmitter TX and the receiver TX function as active radios and each generate a carrier signal. Likewise, by way of further example, to obtain communication link information associated with the passive mode of power consumption, probe packets and responses can be sent using the passive mode configuration in which the transmitter TX functions as an active radio and generates and transmits the carrier signal while the receiver RX functions as a passive radio in a low-power mode that does not require generation of the carrier signal.

Once the receiver RX and the transmitter TX have obtained communication link information at steps 1760a and 1760b relating to their respectively established communication links, the transmitter TX and the receiver RX can transmit their respective communication link information to one another, at steps 1762a and 1762b.

The battery information and communication link information acquired at steps 1752a, 1752b, 1758a, 1758b, 1760a, and 1760b, enable the transmitter TX and the receiver RX to have or determine the power efficiency of the transmitter TX and the receiver RX for each of the power consumption operation modes. It should be understood that the power efficiency refers to the highest bitrate that can be supported for each of the power consumption operation modes, measured, for example, in bits per joule. As described in further detail below, the power efficiency of the transmitter TX and the receiver RX can be used to identify feasible operating modes at step 1764.

FIG. 18 is a chart 1800 illustrating the power efficiency of the transmitter TX (along the x-axis) relative to the power efficiency of the receiver RX (along the y-axis). As shown, the power efficiency of the transmitter TX and the receiver RX are measured in bits per joule, meaning the number of joules required or expended by each device to exchange one bit of data. The chart includes a triangle defined by three points A, B, and C. The three points A, B, and C correspond to the power efficiencies of the transmitter TX and the receiver RX in each of the power consumption operating modes: active mode (point A), passive mode (point B), and backscatter mode (point C). As shown, point A indicates a symmetric, or substantially symmetric, power efficiency between the transmitter TX and the receiver RX (e.g., power efficiency ratio of about 0.9524:1), in the active mode; point B indicates an asymmetric power efficiency in which the receiver RX has a higher power efficiency than the transmitter TX (e.g., power efficiency ratio of about 2546:1), in the passive mode, due to power overhead and burdens such as carrier generation being shifted to the transmitter; and point C indicates an asymmetric power efficiency in which the transmitter TX has a higher power efficiency than then receiver RX (e.g., power efficiency ratio of about 3546:1), in the backscatter mode, due to power overhead and burdens such as carrier generation being shifted to the receiver. It should be understood that the edges of the triangle formed by points A, B, and C indicate the range of power consumption assignments available using the integrated radio that enables switching between power consumption operation modes.

The integrated radio configurations described herein enable multiplexing between the different power consumption operating modes to achieve different power ratios between the transmitter TX and the receiver RX, as shown in the exemplary shaded triangle of FIG. 18. Because it is desirable to achieve a maximum efficiency-meaning the exchange of the most number of bits per joule—it should be understood that some power operating modes, even if they are feasible, may not be preferable to select. In some embodiments, the optimal operating points in terms of overall energy efficiency lie on the line BC of the triangle, which has the best cumulative efficiency (e.g., transmitter efficiency+receiver efficiency). In one example illustrated in FIG. 18, a transmitter TX and a receiver RX have an energy ratio of about 100:1. To operate in a power-proportional manner, the integrated radio and/or its carrier offload algorithm identify a point on the line BC that maximizes the number of bits that can be transferred while operating proportionally, which is illustrated as point P on line BC. This optimal energy efficiency can be used by the carrier offload algorithm in identifying feasible operating modes and an optimal power consumption strategy.

Still with reference to FIG. 17, at step 1764, the transmitter TX identifies feasible operating modes from among a set of candidate or potential operating modes. In some embodiments, this process is referred to as "pruning." For instance, in an example embodiment in which active, passive, and backscatter modes are available, the transmitter TX can determine that only two of those three modes are feasible. This can be due to, for example, the power consumption, throughput, range, and/or other factors resulting from or in the non-feasible operating mode. It should be understood that, although not illustrated in FIG. 17, the receiver RX can additionally or alternatively identify feasible operating modes. This is facilitated by the receiver RX having the same access to the same set of transmitter and receiver battery and communication information as is available to the transmitter TX.

Identifying the feasible operating modes in step 1764 can be performed based on the battery information (e.g., energy availability) of the transmitter TX and receiver RX, as well as the power efficiency of the transmitter TX and receiver RX. As described above, the power efficiency refers to the highest bitrate achievable by the transmitter and receiver in each of the operating modes, measured for instance in bits per joule. The power efficiency of the transmitter TX and receiver RX can be calculated using the communication link information of the transmitter TX and receiver RX.

In turn, at step 1766, the transmitter TX uses the identified feasible operating modes to calculate an optimal strategy for exchanging the data. It should be understood that, although not illustrated in FIG. 17, the receiver RX can additionally or alternatively calculate the optimal strategy. The optimal strategy indicates the fraction of time that each of the feasible operating modes is to be used during the data exchange. In some embodiments, the optimal strategy can indicate potential segmentations of the fractions of time that each of the feasible operating modes is to be used and/or the order or sequence in which the fractions of time or segmentations thereof are to be used.

The following exemplary equation (Equation 1) can be used to calculate the optimal strategy in terms of what fraction of time in which to exchange data in each mode p; in order to achieve power-proportionality of the energy consumed by the transmitter and the receiver:

$$\underset{p_1,p_2,p_3}{\text{minimize}} \sum_{i=1}^{3} p_i(T_i + R_i) \text{ subject to } \sum_{i=1}^{2} p_i = 1, \frac{\sum_{i=1}^{3} p_i T_i}{\sum_{i=1}^{3} p_i R_i} = \frac{E_1}{E_2},$$

In Equation 1 above, $E_1$ and $E_2$ are the energy levels at the two devices (e.g., transmitter TX, receiver RX), and $T_i$ indicates that, in power consumption operating mode i, the transmitter TX consumes $T_i$ joules to send one bit of data to a receiver, and $R_i$ indicates the corresponding cost for the receiver to receive one bit of data. Equation 1 can therefore be used at step 1766 to calculate the optimal strategy. Equation 1 can output, for example, the fraction of time or proportion in which to operate under each power consumption operating mode. For instance, the output of Equation 1 can be $p_1=0.5$, $p_2=0.25$, and $p_3=0.25$ (in which $p_1$ is the active mode, $p_2$ is the passive mode, and $p_3$ is the backscatter mode). At step 1766, these fractions of time can be used to calculate a sequence for operating under each of the power consumption operating modes. For example, the transmitter TX can determine at step 1766 a sequence as follows: active→active→passive→backscatter. In this sequence, each execution of an operating mode represents a 0.25 fraction of the entire data exchange. It should be understood that the fractions of time can be divided into segments of time of any size, and the sequence can indicate operation under modes in any order, including sequences in which segments for operating under the same operating mode are not necessarily processed sequentially (e.g., active-→passive→active→backscatter).

At step 1768, the transmitter TX and the receiver RX exchange data according to the optimal strategy calculated at step 1766. That is, during the data exchange, the transmitter TX and the receiver RX control their integrated radios to operate under the power consumption modes for the amount of time and sequence calculated at step 1766. As known to those of skill in the art in view of the present disclosures, the integrated radio of the transmitter TX and the receiver RX can control their hardware and components, for example using an antenna switching module, to enable active, passive, and backscatter communication functionality.

In turn, at step 1770, the transmitter TX and receiver RX can dynamically monitor the communication to ensure that the data exchange is functioning optimally, as desired, or at least not failing. In other words, the transmitter TX and receiver RX can monitor whether the data exchange is occurring poorly or below certain determined thresholds (e.g., signal-to-noise ratio) when operating in a certain power consumption mode. If so, the transmitter and receiver can switch away from operating under said mode. For example, the transmitter and receiver can be configured such that whenever a data exchange falls below a certain threshold, the active mode will be activated.

More specifically, at step 1770, the transmitter TX and/or receiver RX can continuously or periodically measure (and/or communicate to one another) communication link information and/or battery information. It should be understood that dynamic monitoring can be achieved by measuring communication link and/or battery information at certain time intervals and/or after transmission of a certain number of bits. This information is used by the transmitter TX and/or receiver RX to determine whether, under a given operating mode, the data exchange is properly functioning, for example, in accordance with predefined or dynamically determined parameters, such as signal-to-noise ratio or loss rate. If the transmitter TX and/or receiver RX determines that a given parameter is not being met during the data exchange in a given operating mode, the transmitter TX and/or receiver RX can recalculate the optimal strategy in a manner that avoids or minimizes use of that operating mode. For example, if it is determined that, in the passive mode, the signal-to-noise ratio during the data exchange of step 1768 is below a threshold, the transmitter TX and/or receiver RX can recalculate the optimal strategy to favor the active receiver mode such that the signal-to-noise ratio can be improved. In some embodiments, if the receiver RX identifies the low signal-to-noise ratio, the receiver RX can turn off the carrier or carrier generator, which implicitly informs the transmitter TX that it needs to turn on carrier generation at its end. Similarly, the transmitter TX and/or receiver RX can recalculate the optimal strategy when the signal-to-noise ratio is high, such as in the active power consumption operating mode. The dynamic monitoring and/or data exchange is continued until all of the data obtained at step 1750 has been transmitted.

Computer Implementation

FIG. 19 illustrates a block diagram of the physical components of an exemplary embodiment of the controller, or computer, 1900 that can include an integrated radio and/or execute energy-aware carrier offload software described herein (e.g., FIG. 14, software 1444*a*). Although an exemplary computer 1900 is depicted and described herein, it will be appreciated that this is for sake of generality and convenience. In other embodiments, the computer 1900 may differ in architecture and operation from that shown and described here. The computer 1900 can be a tablet computer, mobile device, smart device, wearable device, smart phone, laptop computer, desktop computer, cloud-based computer, server computer, multiple of the above, and so forth.

The illustrated computer 1900 can include a processor 1922 that controls the operation of the computer, for example, by executing embedded software, operating systems, device drivers, application programs, and so forth. The processor 1922 can include any type of microprocessor or central processing unit (CPU), including programmable general-purpose or special-purpose processors and/or any of a variety of proprietary or commercially-available single or multi-processor systems. As used herein, the term processor can refer to microprocessors, microcontrollers, ASICs, FPGAs, PICs, processors that read and interpret program instructions from internal or external memory or registers, and so forth. The computer 1900 can include a memory 1924, which can provide temporary or permanent storage for code to be executed by the processor 1922 or for data that is processed by the processor. The memory 1924 can include read-only memory (ROM), flash memory, one or more varieties of random access memory (RAM), and/or a combination of memory technologies. The various components of the computer 1900 can be interconnected via any one or more separate traces, physical busses, communication lines, etc.

The computer 1900 can include an interface 1926, such as a communication interface or an I/O interface. A communication interface can enable the computer 1900 to communicate with remote devices (e.g., other controllers or computer systems) over a network or communications bus (e.g., a universal serial bus). An I/O interface can facilitate communication between one or more input devices, one or more output devices, and the various other components of the computer 1900. For example, the interface 1926 can communicate with the computer components of a second computer (e.g., an integrated radio of the second computer). Exemplary input devices include touch screens, mechanical buttons, keyboards, and pointing devices. Additional exemplary output devices include a projector, electronic display screens, and speakers. The computer 1900 can include a storage device 1928, which can include any conventional medium for storing data in a non-volatile and/or non-transient manner. The storage device 1928 can thus hold data and/or instructions in a persistent state (i.e., the value is retained despite interruption of power to the computer 1900). The storage device 1928 can include one or more hard disk drives, flash drives, USB drives, optical drives, various media disks or cards, and/or any combination thereof and can be directly connected to the other components of the computer 1900 or remotely connected thereto, such as through the communication interface. The computer 1900 can include a display 1930, and can generate images to be displayed thereon. In some embodiments, the display 1930 can be a vacuum fluorescent display (VFD), an organic light-emitting diode (OLED) display, or a liquid crystal display (LCD). The computer 1900 can include a power supply 1932 and appropriate regulating and conditioning circuitry. Exemplary power supplies include batteries, such as polymer lithium ion batteries, or adapters for coupling the computer 1900 to a DC or AC power source (e.g., a USB adapter or a wall adapter).

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. A method for power-proportionally exchanging data, comprising:
    obtaining first power information corresponding to a first device and first communication data corresponding to a first communication link between the first device and a second device;
    receiving second power information from the second device, the second power information corresponding to the second device;
    determining one or more feasible operating modes from among a plurality of candidate operating modes, the one or more feasible operating modes being determined based, at least in part, on one or more of the first power information and the second power information, the plurality of candidate operating modes including an active mode, a passive mode, and a backscatter mode;
    calculating an optimal strategy for exchanging data with the second device based on the determined one or more feasible operating modes; and
    exchanging the data with the second device according to the calculated optimal strategy.

2. The method of claim 1, further comprising receiving, from the second device, second communication data corresponding to a second communication link between the first device and the second device.

3. The method of claim 2, wherein the one or more feasible operating modes are determined based on one or more of the first power information, the second power information, the first communication data, and the second communication data.

4. The method of claim 2, wherein the first power information and the second power information comprise respective battery information, the battery information including one or more of a battery capacity and a battery availability.

5. The method of claim 4, wherein the first communication data and the second communication data comprise respective signal-to-noise ratios and bitrate information corresponding to each of the plurality of candidate operating modes.

6. The method of claim 5, wherein the bitrate information of the first communication data and the second communication data indicates maximum bitrates over the respective first communication link and second communication link for each of the plurality of candidate operating modes.

7. The method of claim 1, wherein the obtaining of the first communication data includes transmitting one or more probe packets to the second device over the first communication link.

8. The method of claim 1, wherein the optimal strategy indicates an amount of time in which to exchange the data under each of the one or more feasible operating modes.

9. The method of claim 8, wherein the optimal strategy further indicates an order in which to exchange the data for the indicated amount of time under each of the one or more feasible operating modes.

10. The method of claim 9, wherein the optimal strategy is at least partially proportional to the first power information and the second power information.

11. A computing device comprising:
an integrated radio configured with active radio functionality and passive radio functionality; and
a microcontroller communicatively coupled to the integrated radio, the microcontroller being operable to:
obtain first power information and first communication data corresponding to a first communication link with another computing device;
receive, from the other computing device, second power information and second communication data corresponding to a second communication link with the other computing data;
determine one or more feasible operating modes from among a plurality of candidate operating modes, the one or more feasible operating modes being determined based, at least in part, on one or more of the first power information, the second power information, the first communication data, and the second communication data, the one or more feasible operating modes including one or more of an active mode, a passive mode, and a backscatter mode;
calculate an optimal strategy for exchanging data with the other computing device, based on the one or more feasible operating modes; and
exchange the data with the other computing device according to the calculated optimal strategy.

12. The computing device of claim 11, wherein the computing device can be configured as a transmitter or a receiver.

13. The computing device of claim 12, wherein the computing device is configured as the transmitter and operable to transmit the data to the other computing device configured as a receiver, the receiver being operable to receive the transmitted data from the transmitter.

14. The computing device of claim 11, wherein the integrated radio is at least one of a Bluetooth radio and a Wi-Fi radio, and wherein the passive radio functionality of the integrated radio includes a backscatter tag functionality and a backscatter reader functionality.

15. The computing device of claim 11, wherein the first power information includes battery information corresponding to the computing device, and wherein the second power information includes battery information corresponding to the other computing device.

16. The computing device of claim 11, wherein the first communication data and the second communication data comprise respective signal-to-noise ratios and bitrate information corresponding to each of the plurality of candidate operating modes.

17. The computing device of claim 11, wherein the obtaining of the first communication data includes transmitting one or more probe packets to the other computing device over the first communication link.

18. The computing device of claim 11, wherein the optimal strategy indicates an amount of time in which to exchange the data under each of the one or more feasible operating modes.

19. The computing device of claim 11, further comprising an antenna switching module communicatively coupled to the microcontroller and the integrated radio, the antenna switching module being operable to select one of a plurality of antenna of the integrated radio.

20. A computing device, comprising:
an integrated radio configured with active radio functionality and passive radio functionality, the computing device configured as a transmitter and operable to transmit the data to another computing device configured as a receiver, the receiver being operable to receive the transmitted data from the transmitter; and
a microcontroller communicatively coupled to the integrated radio, the microcontroller being operable to:
obtain first power information and first communication data corresponding to a first communication link with the other computing device;
receive, from the other computing device, second power information and second communication data corresponding to a second communication link with the other computing data;
determine one or more feasible operating modes from among a plurality of candidate operating modes, the one or more feasible operating modes being determined based, at least in part, on one or more of the first power information, the second power information, the first communication data, and the second communication data, the one or more feasible operating modes including one or more of an active mode, a passive mode, and a backscatter mode, wherein:
in the active mode, the computing device consumes an equal, or substantially equal, amount of power as the receiver;
in the passive mode, the computing device consumes more power than the receiver; and
in the backscatter mode, the computing device consumes less power than the receiver, and
wherein the power consumed by the computing device and the receiver is measured by a number of bits transmitted per unit of respective energy consumed;
calculate an optimal strategy for exchanging data with the other computing device, based on the one or more feasible operating modes; and
exchange the data with the other computing device according to the calculated optimal strategy.

21. The computing device of claim 20, wherein:
in the active mode, the computing device generates a carrier signal and transmits the carrier signal to the receiver using the active radio functionality;
in the passive mode, the computing device generates the carrier signal and transmits the carrier signal to the receiver using the active radio functionality; and
in the backscatter mode, the computing device does not generate the carrier signal and reflects, using a backscatter tag, the carrier signal received from a backscatter reader or the receiver.

\* \* \* \* \*